United States Patent

Dirks

[15] 3,657,712

[45] Apr. 18, 1972

[54] STORING DEVICE FOR SIGNALS

[72] Inventor: Gerhard Dirks, Los Altos Hills, Calif.

[73] Assignee: Dirks Computer Systems Corporation, Los Altos Hills, Calif.

[22] Filed: Nov. 14, 1969

[21] Appl. No.: 876,872

Related U.S. Application Data

[62] Division of Ser. No. 420,294, Dec. 22, 1964, which is a division of Ser. No. 627,441, Dec. 10, 1956, Pat. No. 3,172,082.

[30] Foreign Application Priority Data

Dec. 8, 1955 Great Britain ......................35,358/55

[52] U.S. Cl. ..........340/174.1 C, 179/100.4 PT, 179/100.2 R

[51] Int. Cl. ......................................................G11b 25/04

[58] Field of Search .............340/347 PR, 357, 358, 174.1 C; 179/100.4 PT, 100.2

[56] References Cited

UNITED STATES PATENTS

| | | | |
|---|---|---|---|
| 897,765 | 9/1908 | Morin | 179/100.2 |
| 2,800,642 | 7/1957 | May | 340/174.1 |
| 2,811,709 | 10/1957 | Haselton et al. | 340/174.1 |

*Primary Examiner*—Thomas A. Robinson
*Attorney*—Michael S. Striker

[57] ABSTRACT

A selective signal storing device in which a plurality of discs each having at least one signal storing surface at one face thereof are mounted about a common axis, and in which a plurality of transducer means are coupled together to move simultaneously in a direction transverse to said axis into a position to respectively cooperate with a selected track on the signal storing surface of corresponding discs. The device includes further drive means operable for effecting relative movement between the discs and the transducer means, and means to cause at least a selected one of the transducer means at least during part of such relative movement to effect sensing, recording and erasing on the respective signal storing surface.

6 Claims, 29 Drawing Figures

INVENTOR
GERHARD DIRKS

ATTORNEY

INVENTOR
GERHARD DIRKS

ATTORNEY

INVENTOR
GERHARD DIRKS

ATTORNEY

INVENTOR
GERHARD DIRKS

ATTORNEY

INVENTOR
GERHARD DIRKS

ATTORNEY

INVENTOR
GERHARD DIRKS

ATTORNEY

INVENTOR
GERHARD DIRKS

ATTORNEY

INVENTOR
GERHARD DIRKS

ATTORNEY

INVENTOR
GERHARD DIRKS

ATTORNEY

TWO STAGE COUNTING TUBE SYSTEM

INVENTOR
GERHARD DIRKS

ATTORNEY

INVENTOR
GERHARD DIRKS

ATTORNEY

INVENTOR
GERHARD DIRKS
ATTORNEY

INVENTOR
GERHARD DIRKS

ATTORNEY

INVENTOR
GERHARD DIRKS

ATTORNEY

INVENTOR
GERHARD DIRKS

ATTORNEY

INVENTOR
GERHARD DIRKS
ATTORNEY

INVENTOR
GERHARD DIRKS
ATTORNEY

INVENTOR
GERHARD DIRKS
[signature]
ATTORNEY

STORING DEVICE FOR SIGNALS

CROSS-REFERENCES TO RELATED APPLICATIONS

The present application is a divisional application of the copending application Ser. No. 420,294 filed Dec. 22, 1964 and titled "STORAGE DEVICE FOR SIGNALS," which application Ser. No. 420,294, in turn, is a divisional application of the application Ser. No. 627,441, filed Dec. 10, 1958 and now U.S. Pat. No. 3,172,082, titled "STORAGE DEVICE FOR SIGNALS."

BACKGROUND OF THE INVENTION

This invention relates to selective storage means for signals and has for its main object to provide a much increased storage capacity within a given space volume. The invention envisages an improved cyclic storage device with selective signal sensing and signal recording means.

It is a great disadvantage of the hitherto known cyclic storages, which have been of the drum type, that within a given space volume which they occupy, their storage capacity is relatively limited because such volume includes the nonoperative interior of the drum especially as the diameter of the drum may, in the known arrangements, range from 8 and 10 inches to 20 inches or more. It is a further disadvantage of said known arrangements that these drums must be manufactured with great precision especially as to the concentricity of the storage surface, so as to preserve a substantially constant air gap between that surface and the signal heads used for recording and sensing signals.

It is known also to utilize a disc as a storage means, the disc having or being provided with a record surface on a side face, but such a disc has limitations as to the minimum diameter and maximum diameter of the record surface, and has been found not so universally useful as a drum. In a drum, the circumferential or axial tracks marked cut by the signal heads may very easily be divided into storage areas (e.g., for denominations or words) of constant size and with the same number in each track but, in a disc, the concentric tracks must have respectively, storage areas of greater or less length if each has the same number of such areas.

SUMMARY OF THE INVENTION

It is an object of the present invention to provide a compact large capacity storage means which is free from the said disadvantages of drum and disc.

It is another object of the invention to provide a large-capacity selective storage device for signals comprising a plurality of discs on a common axis each disc having a record surface on at least one face and comprising also means for sensing, recording, and erasing signals on the record surfaces selectively during a relative movement between a disc and its sensing etc. means. This object may be achieved either with the several discs mounted for rotation simultaneously or with the discs mounted for independent rotation selectively; it may comprehend all the discs being mounted on a single shaft or such discs may be mounted on several shafts each carrying a plurality of discs, and, in the latter case, the invention may include as one of its objects the arranging of the discs so that those on one shaft are intercalated or overlapped with those on another shaft, so as to bring the axes of the various shafts as near together as possible. In any case the invention may provide for the discs being rotated by rotation of the shaft on which they are mounted or by means engaging their outer periphery.

It is another object of the invention to provide for the sensing and/or recording and/or erasing means for two opposed record surfaces on two adjacent discs to be mounted on a common carrier so as to have a simultaneous selection movement with respect to both discs.

It is a further object of this invention to provide a large-capacity storage device for signals in which there is a plurality of signal-storing discs, with appropriate signal-recording and signal-sensing means, and in which there is a further storage means, also with signal-recording and signal-sensing means, and wherein there is a selective signal transfer arrangement for transferring signals form said further storage means to one or more of the said signal-storing discs, and vice versa, whereby said further storage means may operate as an intermediate storage between said discs and input and/or output means. Said further storage means will preferably be of a rotary type, for example a drum or disc or a plurality of discs, but it may also be a tape or any static type of storage. It may comprise a counting chain or a counting tube system or the like. When adapted for cyclic operation for sensing, such further storage means may be adapted for operation at a faster rate than that of the said storage discs.

The record surfaces or signal-storing surfaces may be permanently associated with the discs or may be interchangeably associated with the discs. Alternatively, the invention has as one of its objects an arrangement in which the discs themselves are interchangeably associated with their driving and/or mounting means. In cases where record surfaces are interchangeably associated with the discs, such surfaces may be on elements which are slotted so as to allow of being passed on to the shaft laterally and in such event the disc may have a raised radial portion adapted to fill the slot in the record surface element when such surface is in position. In this event there may be means whereby the sensing etc. means is raised when it approaches the said raised portion lying in the slot and is lowered again after passing over the slot and its filling.

Shifting means may be provided for a radial shifting of the signal heads relatively to the discs for selection of storage positions on the discs, and in any arrangement a selection dependent on time may be used for a selective transfer of information signals to or from the discs, especially when the transfer is made from or to an intermediate storage as mentioned above.

It is an object of the invention that such a selection based on time may be effected by means which includes multistage tubes, or counting tube systems operated by pulses in dependence on the rotation of the selected disc or discs and/or of the intermediate storage when provided.

When, as usually is the case, there are parallel signal tracks marked out by respective signal heads, there may be one such track for each element or channel of a code combination. In such a case there may be a separate disc for each element of the code, each with its own signal head, and the simultaneous sensing of all the discs will sense a combination of signals.

It is another object of the invention to provide each record surface of a disc in two or more parts which are applied to the discs separately so as to be applicable and removable without the removal of the disc from its mounting and yet so as to provide an uninterrupted record surface when in position. Alternatively, the record surfaces may be interchanged by endwise removal and replacement relatively to the central shaft on which they are mounted, the bearing or bearings for such shaft being removable or releasable to allow of the passage of the discs from and to the shaft.

There may be suitable spacing means between the several discs on a shaft for spacing the discs axially and such spacing means may comprise inserted bushings, tubes or the like between adjacent discs or may comprise bushings or bosses on the discs themselves and/or shoulders on the shafts on which the discs rest. In the latter case each successive disc would have a smaller central opening to fit on a smaller part of the central shaft.

The discs may be permanently spaced axially on their central shaft, but another object of the invention is to allow some or all of them to be axially movable for selection purposes. For example, some or all the discs may be adapted normally to pack together in a small space with means for selectively separating any two of them to provide a gap for the entry of signal heads between them where selection of a record surface is desired for sensing, etc.

In such an arrangement, the invention may provide for the discs being repacked together automatically after each sensing operation or, in an alternative, it may provide that they remain in the previously selected separated position and the next separation be made at any desired point without regard to any previous separation which may have occurred, the previous gap being closed by movement of some of the discs in the succeeding selection. There may be means preventing an actual face to face contact between adjacent discs when packed together.

The means for separating the packed discs may operate at the center of the discs or at the periphery of the discs or both. The discs may be mounted on separate carrying means for selective operation.

Yet another object of the invention is to provide a large capacity signal storage means embodying storage discs in which the discs may be arranged in successive groups on the one shaft, with means for introducing a relative movement between the discs and sensing etc. means to select a particular group and means for introducing a further relative movement to select a particular disc in a group. Either of these selecting movements may occur before the other or they may be simultaneous movements and the separation of selected discs if they are not permanently separated may take place before, during or after such selection movements.

Finally, it is an object of the invention to provide a signal generator operating synchroneously with a plurality of discs, for operating selection means for such plurality of discs. This signal generator may include a rotor mounted on the same shaft as the record discs or one of the record discs themselves may be adapted also to function as such rotor. The signals generated may indicate the beginning or ending or a series of signals, e.g., the signals in separate columns of information, or other signals, may be provided indicating the beginning and/or ending of a group of such series of signals. Such signals may be arranged to operate electric or magnetic counting mechanisms, e.g., counting chains. The counting means may include one or more multistage counting tubes, and in any case the signals indicating a column or a group of columns may be adapted to switch the counting means back to the starting point. Such signals may be separate synchronizing signals or may be interruptions in a pulse series between the pulses for one column and those for the next.

Group signals may be provided for checking the correctness of a count by means of a comprising device, as for instance by checking the time instant of a carry over.

Selection may be effected by a comparison between signals in the counting arrangement and prearranged counts indicating the address signal for the information to be selected.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
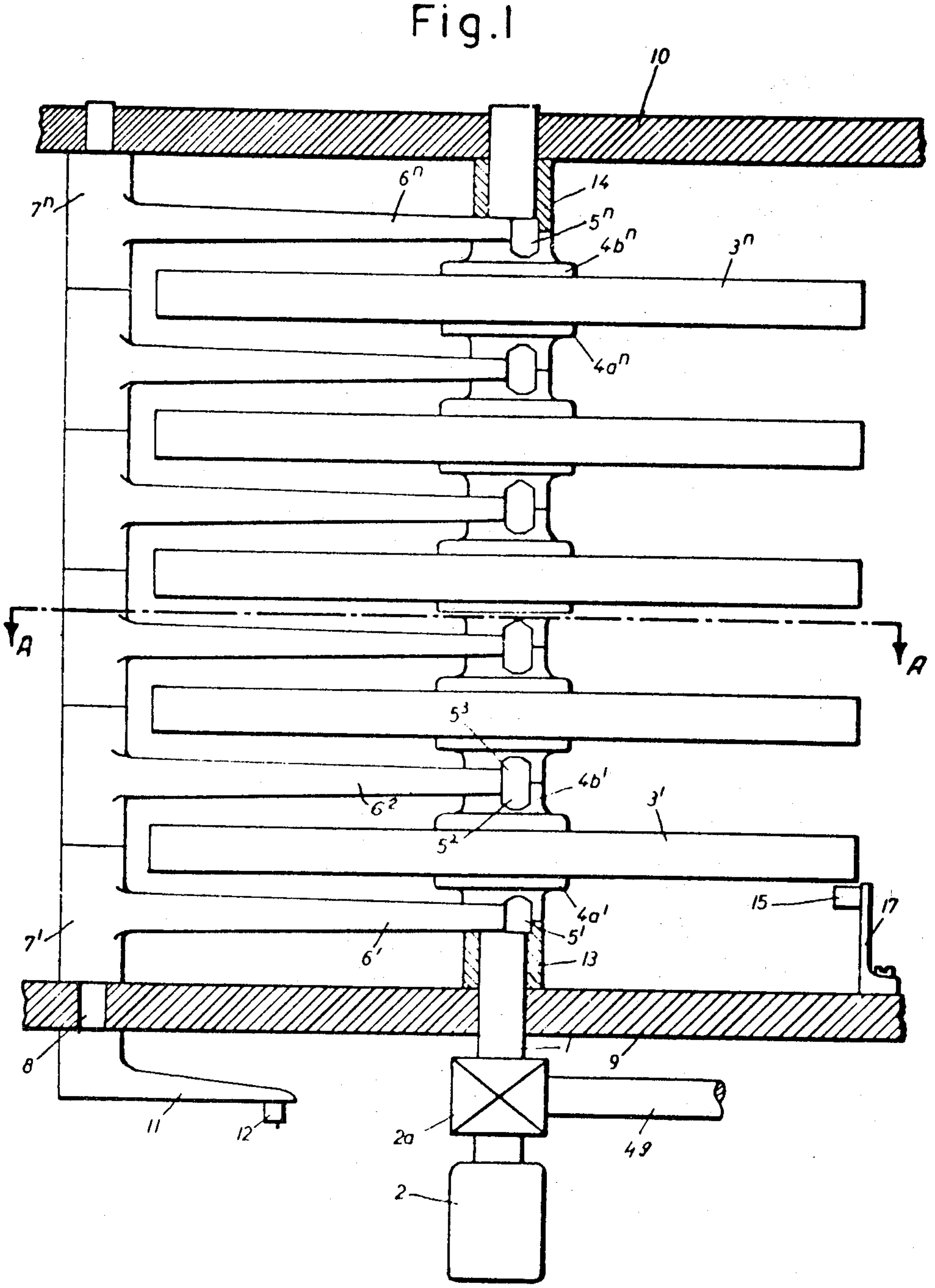
FIG. 1 is a front view of the mechanical arrangement of a disc storage with a plurality of storage discs and sensing and recording means therefore.

Referring first to FIG. 1, the mechanical structure of the selective storage device includes the shaft 1 which is driven by a motor 2 through gear 2*a*. A plurality of storage discs $3^{1-n}$ are mounted on the shaft 1 by means of holding bushings $4a^{1-n}$ and $4b^{1-n}$. At each side of each storage disc $3^{1-n}$ is a signal sensing and recording element indicated collectively as $5^{1-n}$.

These sensing and recording elements are mounted on movable arms $6^{1-n}$, which in turn are mounted on a shaft 8 by means of the bearing parts $7^{1-n}$. Shaft 1 and shaft 8 have their axes mutually parallel and they journaled in side members 9, 10. Shaft 8 is provided with a crank arm 11 furnished with the crank pin 12. Furthermore, two distance buffers or locating members 13 and 14 are mounted on the shaft 1, these serving to prevent an axial shifting of the shaft 1 in its side members 9 and 10. Furthermore, a sensing element 15 is mounted adjacent the first storage disc $3^1$, on the side member 9 by bracket 17. This element is used for the sensing of the synchronization signals.

Figure 2:
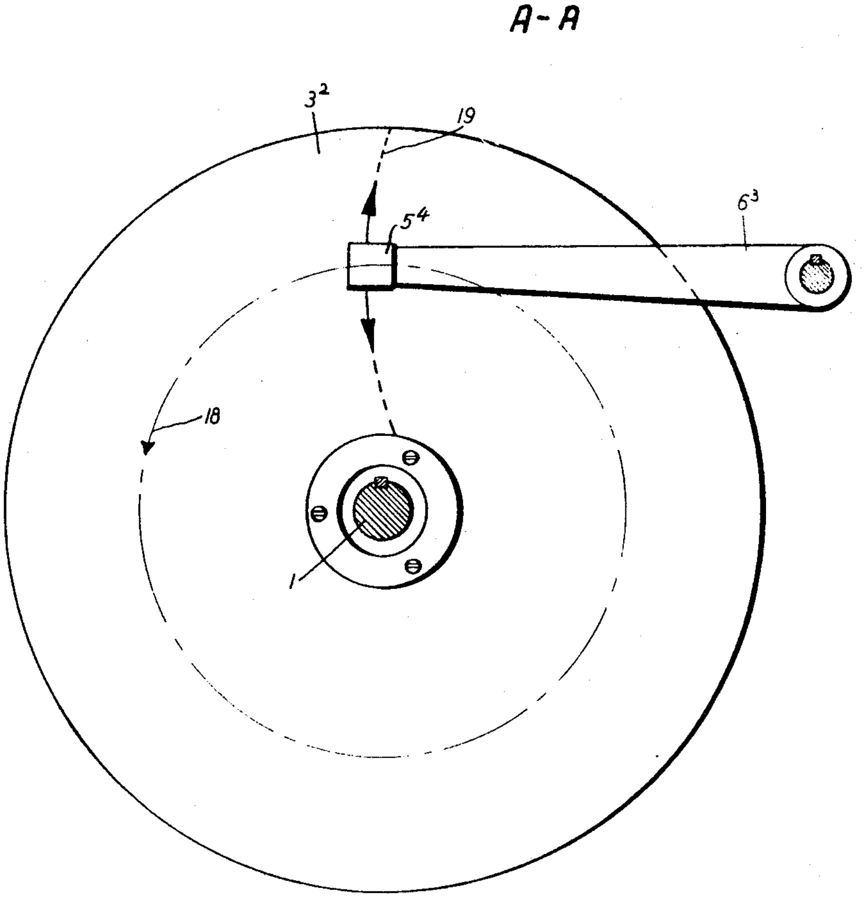
FIG. 2 shows the same arrangement as a cross section on line A—A of FIG. 1.

FIG. 2 shows more clearly the possible relative movements between the storage disc $3^2$ and the movable arm $6^3$ with the sensing element $5^4$. The storage disc $3^2$ is rotated by the motor 2 (FIG. 1) rotating the shaft 1, resulting in a relative movement between the disc $3^2$ and the sensing element $5^4$ corresponding to the circular path shown by broken lines 18. The sensing element $5^4$ is moved by arm $6^3$ in a path shown by the broken line 19 relatively to the storage disc $3^2$. It is thus possible to use different circular tracks as storage areas, these tracks being arranged concentrically to the circular line 18. The movement of the sensing element $5^4$ is effected by movement of the arm $6^3$ by the arm 11 shown in FIG. 3.

Figure 3:
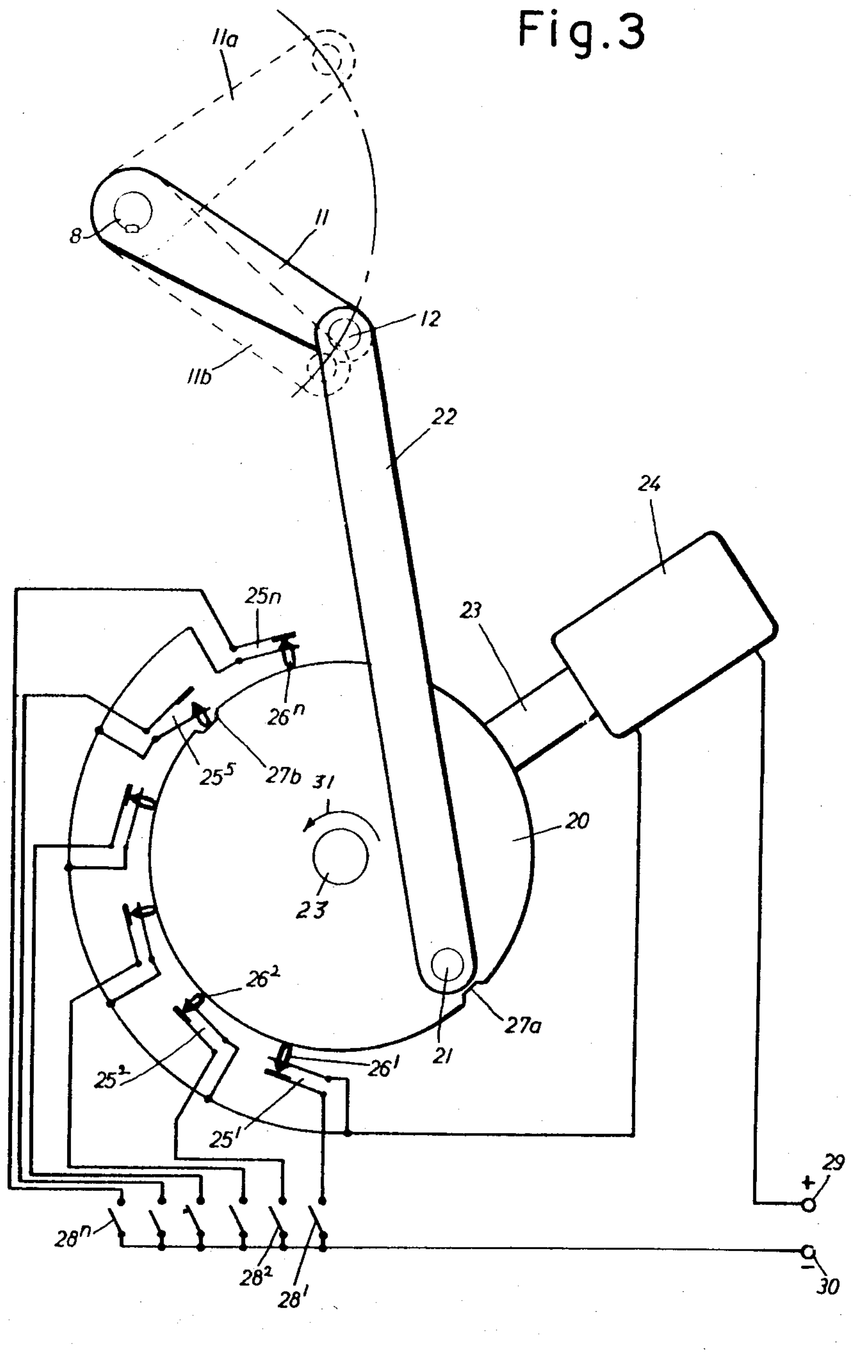
FIG. 3 shows the mechanical parts of the control unit for the selection of the track.

The driving device shown in FIG. 3 includes the disc 20 with the crank pin 21. The crank pin 21 is connected with the crank pin 12 or arm 11 by connecting rod 22. A rotary movement of motor 24, shaft 23 and disc 20 allows the movement of the arm 11 between two limit positions 11*a* and 11*b*, shown by broken lines. As arm 11 is mounted on shaft 8 together with the arms $6^{1-n}$, (FIG. 1) a movement of arm 11 causes a corresponding movement of the arms $6^{1-n}$.

The control of the extent of the pivoting movement of the disc 20 is effected by the contacts $25^{1-n}$. These contacts are arranged at the circumference of disc 20 in such a way that push rods $26^{1-n}$ made of insulating material and sliding on the periphery of disc 20 normally maintain the contacts $25^{1-n}$ in a closed position. If the position of disc 20 relative to the contacts $25^{1-n}$ is such that one of the notches 27*a* or 27*b* is opposite one of the push rods $26^{1-n}$, the corresponding contact $25^{1-n}$ is opened, as shown for the contact $25^5$. The contacts $25^{1-n}$ are each connected in series with contact $28^{1-n}$. These contacts $28^{1-n}$ are operated by means described later on.

If one of the contacts $28^{1-n}$, for instance the contact $28^2$ is closed, a current flows from plus pole 29 through the winding of motor 24 to the movable contact arm of the contact $26^2$ and through this contact and the then-closed contact $28^2$, to the minus pole 30.

Motor 24 is thus energized and disc 20 is rotated by said motor in arrow direction 31. This rotation continues until notch **27*b* is opposite to the push rod $26^2$ of contact $25^2$, when this contact is opened and the circuit through the motor is interrupted, so that disc 20 is arrested and arm 11** is thus shifted through a predetermined angle with reference to one of the limit positions.

Thus, the selection of one of the storage tracks of one of the storage discs $3^{1-n}$ is performed according to the predetermined angle of shift.

The selection of one of the storage discs $3^{1-n}$ and which side of the selected storage disc is to be used for sensing or recording, is effected by moving the sensing and recording elements $5^{1-n}$ from the position shown in FIG. 1 into a position adjacent the recording surface of the selected side of the selected storage disc. The device by which this is effected is shown in more detail with reference to FIG. 4.

Figure 4A:
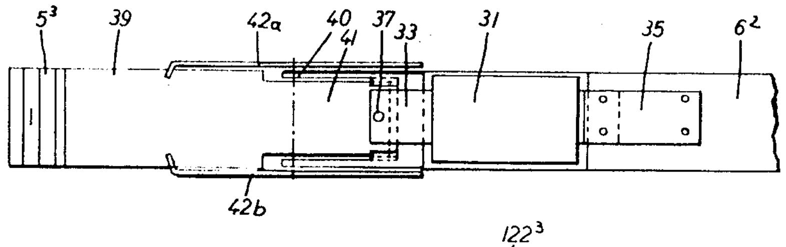
FIG. 4*a* shows a top view the selection device for the sensing and recording means.
Figure 4B:
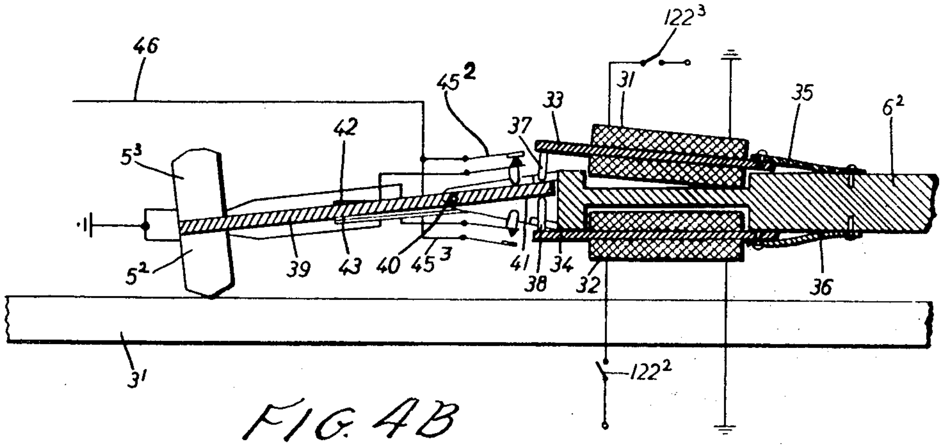
FIG. 4*b* is a longitudinal section through the selection device.

The FIG. 4, the carrier arm $6^2$ is provided with two notches, in which there are the windings of the two magnet coils 31 and 32. These magnet coils are fixed upon two movable armatures 33 and 34, which are supported by the blade springs 35 and 36 on the carrier arm $6^1$. If one of the two coils 31 or 32 is energized, the respective armature 33 or 34 moves into the position shown for armature 34 in FIG. 4. Armatures 33 and 34 each carry one of two push rods 37 and 38. Between these two rods is the rear end of a movable carrier 39. The movable carrier is pivoted about a pin 40 carried by two projections **42*a* and 42*b* of the arm $6^2$. The rear end 41 of the movable carrier 39 is moved by the energization of magnet 32**, so that the sensing and recording element $5^2$ is moved into cooperation with the surface of the storage disc $3^1$.

The movable carrier 39, when the coils 31 and 32 are not energized, is held by the two springs 42 and 43 in its middle position.

If coil 31 is energized the movable carrier 39 is moved to the opposite position, so that the recording and sensing element $5^3$ is moved into cooperation with a surface of the storage disc $3^2$. The two contacts $45^2$ and $45^3$ are operated by the rear portion of the movable carrier part 39, so that the recording and sensing element connected with the entry lead 46 is that which is in a sensing position relative to the selected one of the storage disc surfaces.

An intermediate storage device is provided for input and output. The intermediate storage device is shown in more detail in FIG. 5. The intermediate storage device includes a drum 47 with a magnetizable surface.

Figure 5:
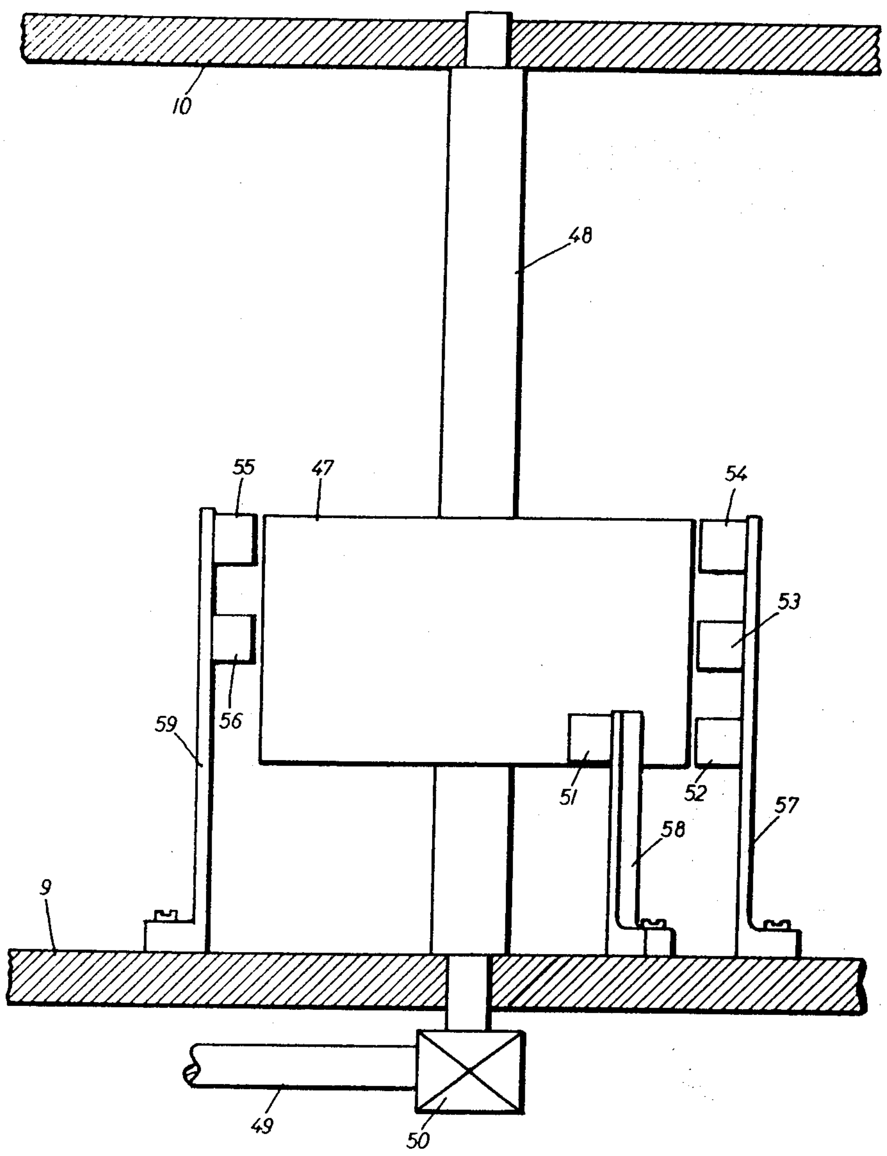
FIG. 5 shows the mechanical structure of the intermediate storage device.

In FIG. 5, the drum 47 is mounted on a shaft 48 which is rotatable in the two side members 9 and 10. The shaft 48 is driven by motor 2 (FIG. 1) through gear **2*a* (FIG. 1), shaft 49 and gear 50 (FIG. 5). The speed ratio between the gears 2a and 50 is such that the ratio between the rotation speed of the storage discs $3^{1-n}$ and that of the intermediate storage drum 47 is equal to the number of storage areas within one storage track of a storage disc $3^{1-n}$. If, for instance, each of the storage tracks on a disc includes one hundred storage areas, each of which storage areas may comprise a record area for information signals of one "word," then the intermediate storage drum 47** will rotate at a speed one hundred times as fast as that of the storage discs $3^{1-n}$. It is evident that other speed relationships may be used. If the intermediate storage, for instance, contains 10 such words within one track, then in such case the relationship would be one to 10 and so on.

Signal heads 51 to 56 are arranged adjacent the magnetizable surface of the intermediate storage drum 47. The signal heads 51 and 52 are used for handling synchronizing signals whereas the signal heads 53 and 54 are used for the handling of signals which are to be transferred from the drum to the storage discs $3^{1-n}$ or signals which are to be transferred from the storage discs $3^{1-n}$ to the drum 47. The signal heads 55 and 56 are used for transfer of signals from an input means to the intermediate storage drum or from the intermediate storage drum to an output means. The signal heads 51 to 56 are positioned relatively to the magnetizable surface of the intermediate storage drum 47 in such a way that a suitable air gap is provided. The signal heads are supported on the side member 9 by means of holders 57, 58, and 59.

Figure 6:
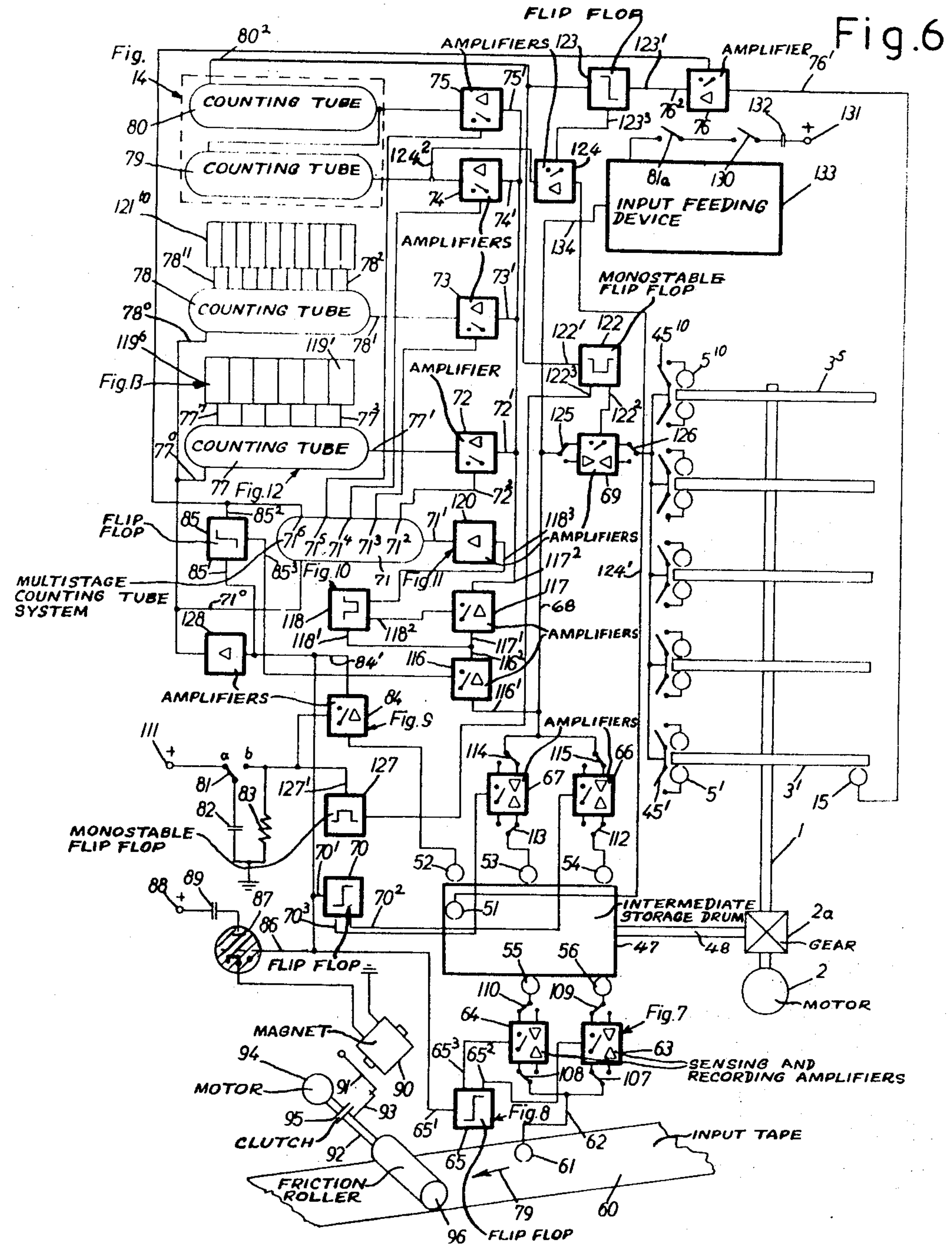
FIG. 6 shows the main switching diagram for the electric control parts for the mechanism of FIGS. 1–5.

FIG. 6 shows a schematic switching diagram of the electronic control arrangements for the large-capacity storage means, the mechanical structure of which has been described above. In FIG. 6, merely mechanical parts, used directly for operating the storage means, are shown only diagrammatically. Motor 2 drives shaft 1 and the storage discs $3^{1-5}$ through the gear **2*a*, as described above. The intermediate storage drum 47 is driven through gear 2*a* and through shaft 48. Shaft 49 and gear 50 have not been shown in FIG. 6** in order to simplify the representation.

The selection of any desired storage area on one of the storage discs $3^{1-5}$ and the recording or sensing of information in such an area is effected in the following way. Information signals which are to be stored on one of the storage discs $3^{1-5}$ are fed into the device through the magnetic tape 60 used as input means. The sensing of the information signals from the magnetic tape 60 is effected by the sensing head 61, by which these signals are transferred as pulses through lead 62 to one of the two sensing and recording amplifiers 63 and 64. The two amplifiers 63 and 64 operate alternately and are controlled by the flip-flop 65. The recording of the sensed information on the intermediate storage drum 47 is effected by one of the signal heads 55 and 56. The information signals, when they have been so recorded, are sensed from the intermediate storage drum 47 by one of the two signal heads 53 and 54 and are amplified by one of the two amplifiers 66 or 67. The information is now conducted as pulses through lead 68 to the recording sensing amplifier 69 from which the information may be recorded on one of the storage discs $3^{1-5}$ by one of the heads $5^{1-10}$. The two amplifiers 66 and 67 also operate alternately and are controlled by the flip-flop 70.

While information is being sensed from the magnetic tape 60 and recorded in the intermediate storage drum 47, information previously recorded on the intermediate storage drum by one of the signal heads 54 and 53 may be recorded on one of the storage discs $3^{1-5}$. This simultaneous operation means that the transfer of information from the magnetic tape 60 to the intermediate storage drum 47 requires no additional time, because the time required for the transfer process is determined by the time required for the transfer from the intermediate storage drum 47 to one of the storage discs $3^{1-5}$, the transfer from magnetic tape 60 to intermediate storage drum 47 taking place within the same time period. The recording of the signals on the storage discs $3^{1-5}$ by the signal heads $5^{1-10}$ is effected in concentric circular tracks.

As an example of the high-storage capacity which is possible with the discs $3^{1-5}$ the diameter of the outermost circular track may be approximately 600 mm., whereas the diameter of the innermost track is 300 mm. With such dimensions, and with a distance of 1 mm. from the middle of one track to the middle of the next there may be as many as 150 tracks on one side of a storage disc. If the signal heads are arranged in contact with the magnetizable layer as in the case of the sensing of magnetizable tapes, and if corresponding high-impulse frequency is used, the maximum recording density may be 50 pulses within each millimeter of a track using the appropriate rotation speeds. Therefore, within one track, there may be recorded up to 57,000 pulses so that each side of one of the storage discs $3^{1-5}$ may store approximately 7,000,000 pulses. This storage capacity is equal to the storage capacity of magnetic tapes. But it is preferable, in practice, to use a density of only 10 to 15 pulses per millimeter. The maximum store size is about 50 storage discs having therefore, a capacity of approximately 350,000,000 pulses.

In order to make use of the complete storage capacity with a reasonable access time it is necessary to have a pulse frequency of approximately 200,000 pulses per second as a maximum, which would give a maximum access time of about 0.2 seconds. The distance between the signal heads and the surface of the respective storage discs $3^{1-5}$, or alternatively the direct contact of the signal heads with the magnetic layer, is dependent on the recording requirements, as the number of signals within a given area is dependent on this positioning of the signal heads.

If a shorter access time is required, then the rotation speed of shaft 1 is increased. This will not allow the signal heads $5^{1-10}$ to be in contact with the surface of the storage discs $3^{1-5}$, but necessitates an air gap between the signal heads and the storage discs. On the other hand, a reduction of the pulse frequency with a constant speed of shaft 1, necessitates a greater distance between pulses on the storage tracks. This increase in the distance between pulses in the storage track may be decreasing compensated by the speed of shaft 1, but this on the other hand increases the access time. The access time on the other hand may be decreased again if, instead of there being only one signal head in the circumference of the storage track, a plurality of signal heads is provided. In this case, the access time is not limited by the time required for a single revolution of one of the storage discs $3^{1-5}$. The access time would be shortened according to the number of signal heads mounted around the circumference of a storage track.

In order to simplify the representation of the invention, not all the possibilities mentioned above have been included in the circuit arrangement of FIG. 6. For instance, the control means is shown for only 6 concentric recording tracks on each side of storage discs $3^{1-5}$ and, on the other hand, only five of these storage discs $3^{1-5}$ have been shown in FIG. 6. It is evident, however, that the number of tracks and/or discs may be increased in any desired way.

In the operation of this control device the address, that is, the indication of the area of the storage discs on which the signals are to be recorded, is fed from the magnetic input tape 60 through the intermediate storage drum 47 into the appropriate control means. The distribution of these address signals into the different control means and the determining of the functions which have to be controlled by the various signals, is effected by the multistage counting tube system 71. The counting tube system 71 controls the amplifiers 72, 73, 74, 75, and 76. Amplifiers 72 and 75 deliver pulses to the counting tube system 77, 78, 79, and 80 for the control of the selecting device for the signal heads $5^{1-10}$.

Figure 9:
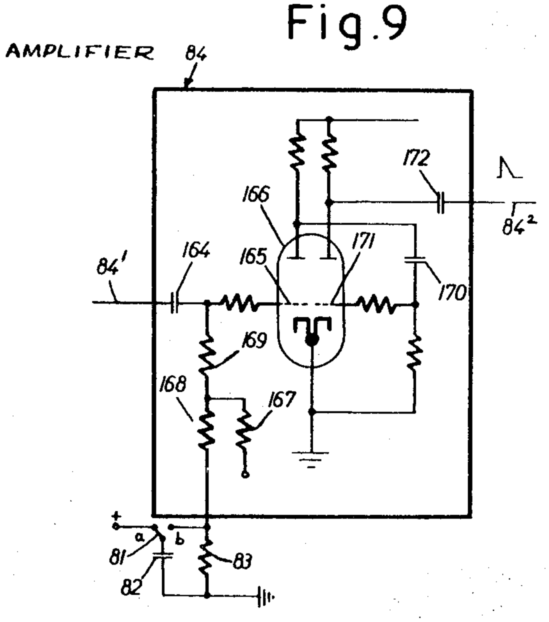

The starting signal for this selecting process is given by actuation of switch 81, either by automatic control or manually, thereby changing said switch from switching position *a* to switching position *b*. The charge which previously had been applied to capacitor 82 will then be discharged through resistor 83 to ground. This causes a voltage difference across resistor 83, whereby the amplifier 84 will be made conductive. The circuit diagram of the amplifier 84 is shown in FIG. 9. If the amplifier 84 is conductive, a signal generated by a small permanent magnetic sheet on intermediate storage drum 47 and sensed by a signal head 52 is amplified by amplifier 84. This pulse signal is then conducted through the lead $84^1$ to the flip-flops 35, 70 and 65. Simultaneously, this pulse is conducted through lead 86 to the grid of the gas discharge tube 87. The tube 87 then conducts, and the current flows from plus pole 88 through capacitor 89 and the winding of magnet 90 to ground. This current charges the capacitor 89 and energizes the magnet 90, causing armature 91, which normally arrests a projection 93 of the shaft 92, to be momentarily withdrawn so that the projection 93 is released.

Shaft 92 is driven from motor 94 through the friction clutch 95, so that after the momentary release of projection 93, shaft 92 revolves once only. During the revolution of shaft 92 the magnetic tape 60 is moved by the friction roller 96 which is mounted on the shaft 92, for a predetermined step in arrow direction 97. The length of this step of movement of the tape corresponds to the length of an information area, including the address area, the signals in which are to be transferred to the storage discs $3^{1-5}$, or corresponds to a multiple of that length.

Figure 6A:
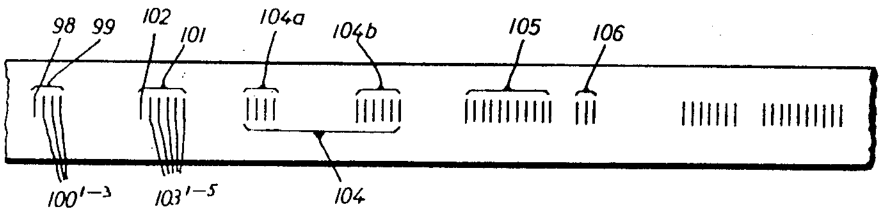
FIG. 6*a* shows the signal arrangement for recording signals within a track.

The arrangement of the various signals on the magnetic tape 60 is shown in greater detail in FIG. 6*a*. The first signal within a group of signals, for instance the signal 98 within the group of signals 99, is a synchronization signal and the signals $100^{1-3}$ determine the storage track on which the following information has to be recorded. Within the signal group 101, signal 102 is a synchronization signal, and the signals $103^{1-5}$ determines on which side of one of the storage discs $3^{1-5}$ this track is located. Further, by the group of signals 104*a* and 104*b* the storage area of the required storage track is determined, this being the area in which the information represented by the following pulse groups 105, 106 and any further information signals are to be recorded.

During the carrying out of the tape movement described above in the arrow direction 97, these signals are sensed by signal head 61 and are conducted through lead 62 and one of the switches 107 or 108 to one of the amplifiers 63 or 64. The switches 107 and 108 determine, together with the two switches 109 and 110, the direction of the amplification of the amplifiers 63 and 64. That is, in the switching position shown, the amplifiers 63 and 64 adapted for the sensing of pulses on the magnetic tape 60, and for their recording on the intermediate storage 47, whereas in the reverse position of the switches 107 to 110, the amplifiers 63 and 64 are adapted for the reverse direction of transfer.

Figure 8:
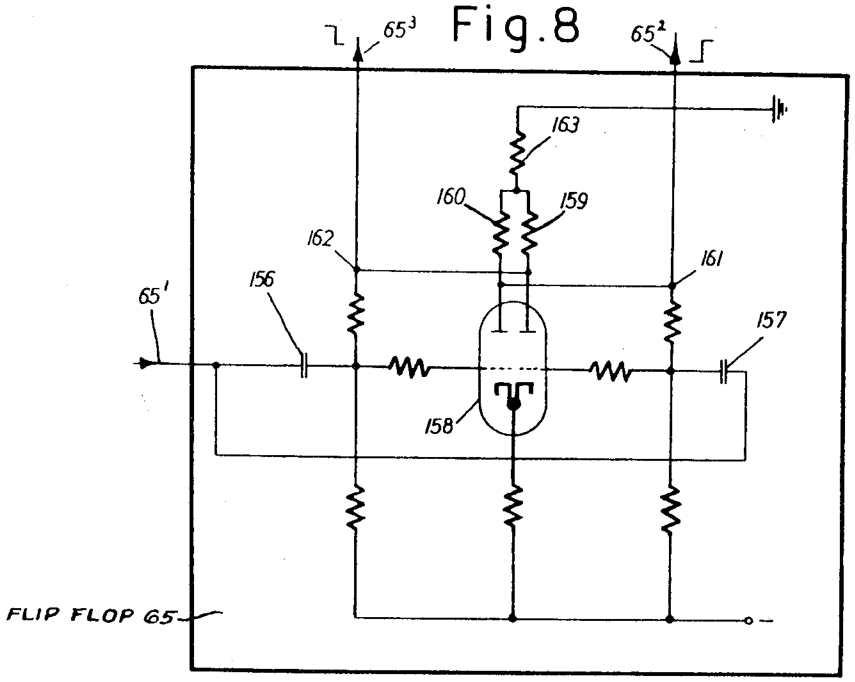

The selection as to which of the two amplifiers 63 or 64 is to amplify the signals sensed by the signal head 61, is determined by the state of flip-flop 65, which is shown in more detail in FIG. 8. The flip-flop 65 is switched alternatively between two states at each pulse conducted to it through lead $65^1$, so that in each successive transfer process the amplifiers 63 and 64 will become effective in the opposite way from that in the preceding process. In the following it is assumed that the first pulse delivered from signal head 52 through amplifier 84 to lead $65^1$ switches the flip-flop 65 into such a state that the amplifier 63 will be made conductive through control lead $65^2$ and amplifier 64 will be made nonconductive through control lead $65^3$. Then the signals sensed by signal head 61 with switch 109 as shown in FIG. 6 are transferred to the signal head 56.

The signals in a recording track are recorded by the signal head 56 on the intermediate storage drum 47. The two signal heads 55 and 56 are displaced with reference to signal head 52 by a predetermined angle of displacement in order to compensate for the delay inherent in operation of the friction clutch 95 and the two control means 91 and 93, at the beginning of the tape movement.

The capacity of the capacitor 82 and the voltage at plus pole 111 are such that the discharge process through resistor 83 and the operation of the amplifier 84, takes approximately the same time as the intermediate storage 47 requires for two revolutions. Thus the pulse generated by the permanent magnetic element at the circumference of the intermediate storage drum 47 is sensed a second time (namely in the second revolution of the drum) by signal head 52, and a second pulse will be conducted through amplifier 84 and output lead $84^1$ to the grid lead 86 of the gas discharge tube 87. Hence, in the manner described above, magnet 90 will be energized for a second time, so that the magnetic tape 60 will make another step of movement.

The pulse delivered through lead 86 to the grid of the gas discharge tube 87 is conducted through lead $65^1$ to the flip-flop 65. The flip-flop 65 is thereby switched to its other state, so that amplifier 63 will be made nonconductive through control lead $65^2$ and amplifier 64 will be made conductive through control lead $65^3$. The second pulse group sensed from magnetic tape 60 by signal head 61 during this second step of movement will be recorded therefore by signal head 55 on a second track parallel to the recording track used before. The second pulse delivered from amplifier 84 is conducted through input lead $70^1$ to the flip-flop 70. The flip-flop 70 will be switched so that amplifier 66 is made conductive through control lead $70^2$ and amplifier 67 is made nonconductive through control lead $70^3$. Thus, information is sensed by signal head 54 during the second rotation of the intermediate storage drum 47, after having been recorded thereon during the first rotation by signal head 56 and is transferred through switch 112 to the amplifier 66. Switches 112, 113, 114, and 115 function in the same way as the switches 107–110, namely to switch over the recording or sensing amplifier into the appropriate transfer direction. The switching positions of the switches 112–115 are shown such that signals are sensed from the intermediate storage drum 47 by the signal heads 53 and 54. In the opposite switching positions signals are recorded on the intermediate storage drum 47 by the two signal heads 53 and 54.

The pulses amplified by amplifier 84 are conducted through input lead $85^1$ to the flip-flop 85. The flip-flop 85 is switched over by the first positive pulse entering at input lead $85^1$ into such a state that the amplifier 116 is made conductive through control lead $85^3$. It is now possible during the second revolution of the intermediate storage drum 47 to amplify within the amplifier 116 those signals which were sensed by signal head 54 and amplified by amplifier 66 and then conducted through switch 115 and input lead $116^1$ to the amplifier 116. Resultant pulses are passed through the output lead $116^2$ and the input leads $117^1$ and $118^1$ to the amplifier 117 and the monostable flip-flop 118, which is shown in more detail in FIG. 10.

Amplifier 117 is normally nonconductive, so that no signals may pass through this amplifier. The first pulse through output lead $118^1$, which had been generated by the signal 98 on magnetic tape 60, switches monostable flip-flop 118 to make amplifier 117 conductive through control lead $118^2$. Thereafter, the following pulses generated by the signals $100^{1-3}$ from magnetic tape 60 pass through the amplifier 117. The time constant of the monostable flip-flop 118 is such that said flip-flop returns to its normal state if, after the last pulse entering through input lead $118^1$, a longer time period has passed than corresponds to twice the time of the repetition rate of the standard pulses.

Consequently, amplifier 117 is made nonconductive as soon as pulse group 99 has been transferred. The pulses from output lead $117^2$ now pass through the input leads $72^1$, $73^1$, $74^1$, and $75^1$ of the amplifiers 72 to 75. The amplifiers 72–75 are controlled by the counting tube stage 71. That is, in the initial counting position of the counting stage 71, only amplifier 72 is made conductive through control lead $72^2$, whereas the amplifiers 73–75 are made nonconductive. Consequently, the pulses occurring at output lead $117^2$ are conducted through input lead $72^1$ to amplifier 72 and the input lead $77^1$ of the counting tube 77. The counting tube 77 is advanced by each of these pulses by one counting stage. According to the counting stage to which the counting tube 77 is advanced by the pulses delivered through amplifier 72, a positive voltage is developed on the particular output lead of the output leads $77^{2-7}$ which correspond to this counting stage. By this positive voltage, the corresponding stage of the control stages $119^{1-6}$ is made effective. One of these stages is shown in more detail in FIG. 13.

Figure 13:
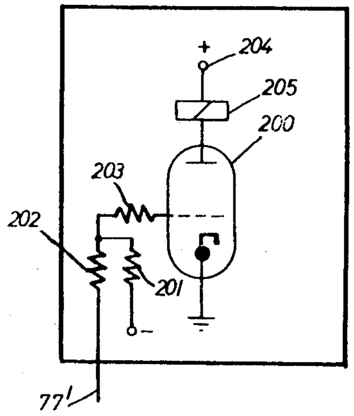

FIG. 13 shows in each of the control stages $119^{1-6}$ a relay controlled by the tube in series therewith. The relay is operated in dependence on the bias condition of the appropriate output lead $77^{2-7}$.

If now one of these relays is energized, then one of the contacts $28^{1-n}$ (FIG. 3) of the relay is closed, so that the control circuit, described above with reference to FIG. 3, becomes operative. That is, a current flows from plus pole 29 through the motor 24 and the closed contacts $25^{1-6}$ as well as through the closed one of the contacts $28^{1-6}$ to the minus pole 30. This current continues until disc 20 has been rotated sufficiently for the notch 27*a* or 27*b* to open the particular contact $25^{1-6}$, which is in series with the closed one of contacts $28^{1-6}$, thereby interrupting the motor circuit. By this movement of disc 20 the movable arms $6^{1-n}$ are adjusted to the predetermined recording track on the storage discs $3^{1-n}$ by connecting rod 22 and the crank arm 11.

The monostable flip-flop 118 is switched for a second time by the first pulse of the second signal group 101, generated by the signal 102, and amplifier 117 is made conductive again. At the return of the monostable flip-flop 118 to its initial state, after the first switching, a pulse is delivered to output lead $118^3$ and conducted to the amplifier 120. This pulse is amplified in amplifier 120, shown in more detail in FIG. 11, and is conducted through input lead $71^1$ of the counting tube system 71, whereby this system is advanced by one counting stage. A positive voltage is now developed on output lead $71^3$, making the amplifier 73 conductive. The positive voltage on lead $71^2$ is now removed so that amplifier 72 is made nonconductive. Thus, the pulses at output lead $117^2$ pass through output lead $73^1$ to the amplifier 73, are amplified within this amplifier and delivered through input lead $78^1$ to the counting tube system 78. The counting tube system 78 is of the same structure as the counting tube system 77 shown in FIG. 12, but a normal commercial counting tube with 12 counting stages is used.

The 10 output leads $78^{2-11}$ control the 10 control stages $121^{1-10}$. These control stages are of the same structure as the control stages $119^{1-6}$ of which one is shown in more detail in FIG. 13. These stages are controlled by the positive voltage, developed on the output leads $78^{2-11}$ at the successive counting positions of the counting tube system 78. Correspondingly, the relay associated with each of these stages $121^{1-10}$ will be energized and an associated one of the contacts $122^{1-10}$ (FIG. 4) is operated.

When one of the relays is energized, then the appropriate one of the contacts $122^{1-10}$ is closed, so that a current flows from the plus pole through the appropriate one of the coils 31 or 32 to ground. Energization of the coils operates the corresponding armature 33 or 34 and the selection process described above with reference to FIG. 4 is carried out to select one side of one of the storage discs $3^{1-5}$. The particular side of the storage discs $3^{1-5}$ selected is dependent on the number of pulses 103 (FIG. 6*a*).

After the pulse group 101 has been passed by the amplifier 117, flip-flop 118 returns to its initial state and another pulse is passed through lead $118^3$ and advances the counting tube system 71 by one counting stage; namely, to that stage which corresponds to the output lead $71^4$. Amplifier 74 is now made conductive and the following pulses, amplified by amplifier 117, are conducted through amplifier 74 to the input lead of counting tube system 79. The counting tube system 79 forms together with counting tube 80 a counting tube system with a maximum counting capacity of 100 pulses, as is shown in more detail with reference to FIG. 14. The pulses generated from the impulse group 104*a* and which are conducted through amplifier 74 to the counting tube 79 represent the first denomination of a two-denomination number, which indicates the address of the storage area within one of the storage tracks where information is to be stored on the storage discs $3^{1-5}$. The counting tube 79 is set by these pulses to the appropriate numerical value.

The counting tube 71 having been advanced by one counting stage by one pulse on lead $118^3$ from flip-flop 118 in a manner described above, amplifier 75 is now made conductive through output lead $71^5$. The second part 104*b* of the pulse group 104 is sensed and conducted through amplifier 117 and amplifier 75 to the counting tube 80. The second denomination of the already mentioned two denomination address is represented by the pulse group 104*b*. After the pulse group 104*b* has been sensed, flip-flop 118 returns to its initial state, so that counting tube 71 will be advanced by another counting stage. A positive voltage is then applied to lead $71^6$ to make amplifier 76 conductive. The voltage at output lead $71^6$ is also passed through lead $85^2$ to the flip-flop 85. The flip-flop 85 will be thereby restored to its initial state, so that amplifier 116 is made nonconductive through control lead $85^3$. The further pulses amplified by amplifier 66 are therefore no longer amplified by amplifier 116. They cannot be passed through amplifier 69 which is made nonconductive under control of monostable flip-flop 122. As amplifier 76 is then conductive, an initial pulse is sensed by the signal head 15 from a storage area of storage disc $3^1$. This pulse enters the amplifier 76 through input lead $76^1$ and is amplified. The pulse is conducted through output lead $76^2$ to the input lead $123^1$ of the flip-flop 123. The flip-flop 123 is set by this pulse into such a state that amplifier 124 is made conductive through control lead $123^3$.

The pulse sensed at each revolution of the intermediate storage drum 47 by signal head 51 and conducted through input lead 124' to the amplifier 124 is amplified by said amplifier. Pulses are generated in signal head 51 by the same permanent magnetic sheet, used for generating pulses in the signal head 52. The two signal heads 51 and 52 are displaced through an angle corresponding to the recording area which is required for the storing of the first three signal groups 99, 101 and 104 on the circumference of the intermediate storage drum 47.

Figure 14:
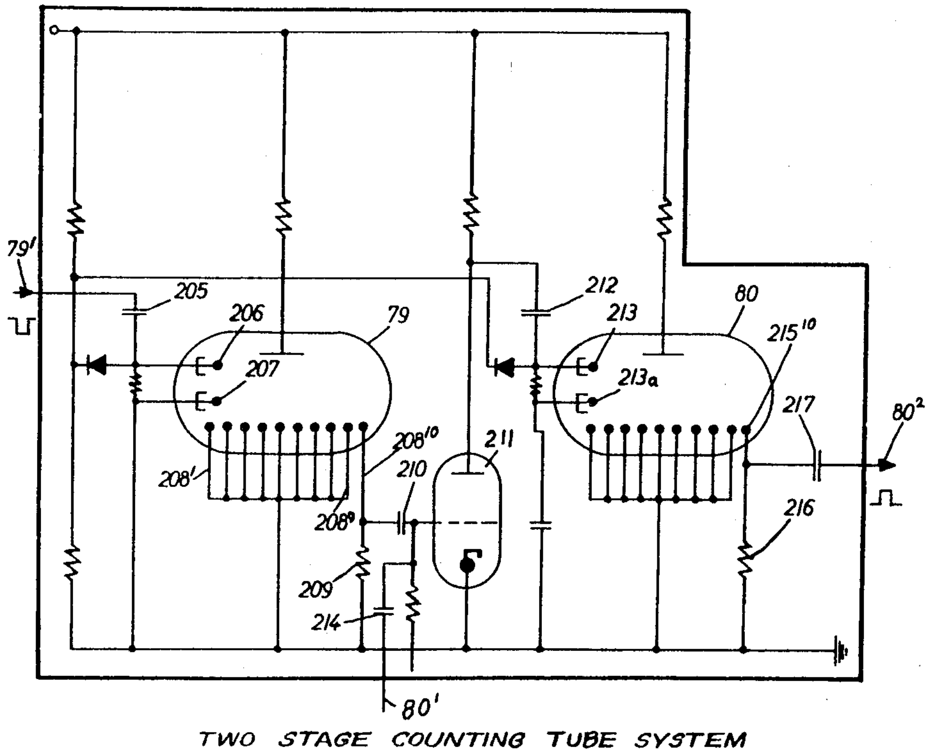

By each pulse sensed by signal head 51 the counting tube system, shown in more detail in FIG. 14 and including the two counting tubes 79 and 80, is advanced by one counting stage. The pulses are conducted from amplifier 124 through output lead $124^2$ to the input lead of counting tube 79. These pulses advance the counting tube system shown in FIG. 14 until its full counting capacity has been reached.

As soon as the maximum capacity of the counting tube system is reached, a positive pulse is delivered through output lead $80^2$ to determine the time instant of the beginning of the recording of the signals representing the information on a storage area on one of the storage discs $3^{1-5}$. During each revolution of the intermediate storage drum 47, the relative movement between the storage discs $3^{1-5}$ and the signal heads $5^{1-10}$ corresponds to the length of track which is required for the recording of the information represented by the signal groups 105, 106, and so on. As during each rotation of the intermediate storage drum 47 a pulse sensed by signal head 51 advances the counting tube system shown in FIG. 14 by one counting stage, the complement of the numerical value to which the counting tube system had previously been adjusted is a measure of the number of storage areas by which the required storage area is shifted relatively to the zero position, which is represented by the pulse sensed by signal head 15.

The recording of these signal groups is effected on the appropriate storage surface of one of the storage discs $3^{1-5}$ as follows. The positive pulse on output lead $80^2$ is conducted through input lead $122^1$ to the monostable flip-flop 122. The flip-flop 122 is switched to make amplifier 69 conductive through control lead $122^2$. The amplifier 69 is also switchable by the two switches 125 and 126 into the two directions of transfer. The switching position of the two switches 125 and 126 as shown corresponds to the transfer direction towards one of the signal heads $5^{1-10}$. The time constant of the monostable flip-flop 122 is such that the amplifier 69 remains conductive for the time period required for the transfer of the whole information. As signal head 51 is shifted by a predetermined angle of displacement with reference to the signal heads 52, 53, and 54, a positive pulse is passed through output lead $118^2$ when the two signal heads 53, 54 sense the beginning of that storage drum area of intermediate storage 47 in which the information is recorded.

Since the energization of one of the coils 31 or 32 (FIG. 4) closes one of the contacts $45^{1-10}$, the signals sensed by signal head 54 and delivered through the two amplifiers 66 and 69 are now recorded on the storage tracks previously selected on one of the storage surfaces of the storage discs $3^{1-5}$. At the end of this recording process, flip-flop 122 returns into its initial state and makes amplifier 69 nonconductive, so that repeated sensing of the pulses in the respective storage track of the intermediate storage 17 is prevented.

Upon the return of the monostable flip-flop 122 to its initial stage, a positive pulse is passed through lead $122^3$ to the monostable flip-flop 127. The flip-flop 127 is switched and makes the amplifier 84 nonconductive through control lead $127^1$ during a time period which corresponds to one revolution of the intermediate storage drum 47, so that the pulse recorded in this track is sensed by signal head 52, whereby the process of sensing and recording will be started anew. Consequently, a positive pulse is passed through output lead $84^1$, and lead 86 to the gas discharge tube 87, whereby said gas discharge tube is made to conduct and the magnetic tape 60 is advanced by another step of movement in arrow direction 97.

Simultaneously, this pulse passes through input lead $65^1$ of flip-flop 65 so that the amplifier 64 is made nonconductive and amplifier 63 is made conductive. Thus, the next pulses sensed from magnetic tape 60 will be recorded in the storage track of the intermediate storage drum 47, which previously had been sensed by signal head 54. As the positive pulse occurring on lead $84^1$ is delivered also to lead $70^1$ of flip-flop 70, the two amplifiers 65 and 67 are also switched over, so that those pulses will then be sensed and amplified by amplifier 67, which previously were recorded by the signal head 55 on intermediate storage drum 47.

The positive pulse occurring on lead $84^1$ is passed through amplifier 128 to the zero stages of the counting tube systems 71, 77, and 78, through leads $71^0$, $77^0$, and $78^0$, whereby each of these stages is returned to its initial position, so that the control processes described above will be repeated.

If information sensed from a storage surface of one of the storage areas $3^{1-5}$ is to be recorded on magnetic tape 60, the switches 107–110, 112–115 as well as 125 and 126, are switched over into their other switching position. Simultaneously, contact 130 is closed. By the switching over of the switches 107–126, the transfer direction of the amplifiers 53, 64, 66, 67, and 69 is reversed, so that signals are then sensed by the signal heads $5^{1-10}$ from the storage discs $3^{1-5}$, and are recorded by the signal heads 53 and 54, respectively on the intermediate storage drum. This information is in turn sensed by one of the signal heads 55 or 56 from the intermediate storage drum 57 and is recorded on the magnetic tape 60.

By closing the contact 130 it is possible to deliver a positive pulse from plus pole 131 at the closing of the contact 81*a*, which is actuated together with contact 81, and to deliver this positive pulse through capacitor 132, and the two closed contacts 130 and 81*a* to the input device 133. This positive pulse provides the signal for the input feeding device 133, through lead 134 to feed in the address of the information which is to be sensed from one of the storage discs $3^{1-5}$. This is accomplished as follows. The pulses which represent the address are similar to those recorded on the magnetic tape 60, as shown in FIG. 6*a*, and enter from lead 134 through lead 68 and lead $116^1$ to the amplifier 116, and after their amplification control in a manner described above similar to the feeding-in process the selection of the required storage area.

Amplifier 116 was in this case made conductive by actuating contact 81 together with contact 81*a*, so that the control process described above follows in conjunction with amplifier 84 and flip-flop 85.

The pulses representing the address are also applied from lead 134 through one of the amplifiers 66 or 67, and are recorded by the signal heads 53 or 54 on the intermediate storage drum 47. The time for starting the sensing of the information from one of the storage discs $3^{1-5}$ is determined as in the example described above, for the feeding in of information from magnetic tape 60, by pulses which are sensed by signal head 51. Similarly, the information is recorded at a time directly following the already recorded address, so that the record of signals is the same as was described with reference to FIG. 6*a*.

These signals are now sensed from the intermediate storage drum by the signal heads 55 or 56, and amplified in the corresponding amplifiers 63 or 64, and are recorded by signal head 61 on magnetic tape 60. In the following description of FIGS. 7–14, the various electronic units used in FIG. 6 are explained in more detail.

Figure 7:
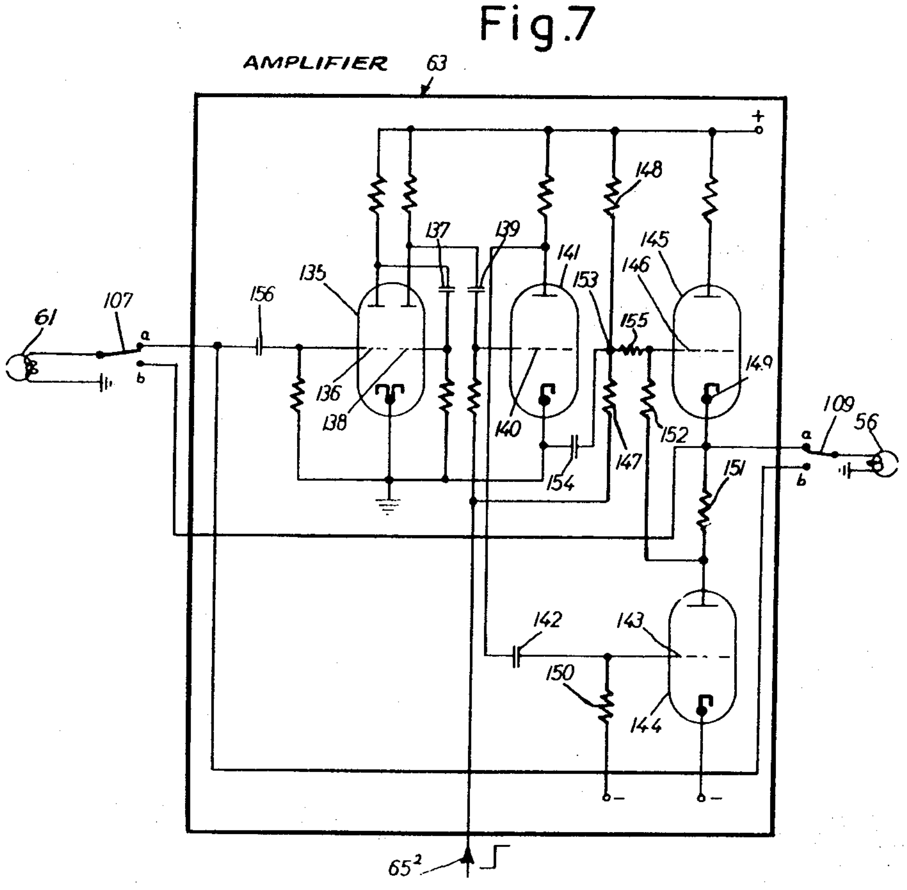
FIGS. 7–14 illustrate various electronic units of the arrangement shown in FIG. 6 but in a greater detail.

FIG. 7 shows one of the recording and sensing amplifiers 63, 64, 66, 67, and 69. The amplifier shown in FIG. 7 is that indicated by reference number 63 of FIG. 6. It includes the double triode 135. The signals are transmitted to the left-hand grid 136 of this triode from signal head 81, when switch 107 is in switching position *a*. These signals are amplified in the left-hand system of the double triode, and are passed by capacitor 137 to the right-hand grid 138 of double triode 135. After the signals have been amplified in the right-hand system of double triode 135, they are passed by capacitor 139 to the grid 140 of triode 141. The triode may be controlled by the flip-flop 65, which is shown in more detail in FIG. 8. The control is effected in such a way that the voltage on control lead $65^2$ is altered in dependence on the state of flip-flop 65.

The condition of control lead $65^2$ is either such that the voltage is negative to a degree such that the pulses arriving through capacitor 139 are not able to increase the bias at grid 140 higher than the cutoff voltage of triode 141 or, on the other hand, such that the said voltage is adjusted to a value at which the pulses arriving through capacitor 139 can alter the bias of grid 140 of triode 141 between the cutoff voltage and zero.

If the control voltage of control lead $65^2$ is negative, so that the pulses arriving at triode 141 cannot affect anode current, then these pulses will be blocked by said triode. On the other hand, if the control voltage is less negative, so that the grid voltage may be altered between the cutoff voltage and zero, then these pulses will be amplified by triode 141 and passed through capacitor 142 to the grid 143 of triode 144.

Simultaneously with the control of triode 141, triode 145 also can be controlled by an alteration of the potential of control grid 146. The potential at grid 146 of triode 145 is determined by the two resistors 147 and 148 and by the voltage at control lead $65^2$. The resistors 147 and 146 are of a value such that the anode current of tube 145 is cut off when the control lead $65^2$ has a negative control voltage. If the control voltage is made less negative, which corresponds to making the triode 141 conductive, then the grid potential of grid 146 increases and reaches approximately the value zero, so that a relatively strong current flows through signal head 56, which, in switching position *a* of the switch 109, is connected with the cathode 149 of the triode 145. This current is used for the erasing of signals which have been recorded on the magnetic layer of the intermediate storage drum 47 passing below signal head 56. The grid 143 of the tube 144 is negatively prebiased through grid resistor 150 to such a degree that in the normal condition of the tube 144 practically no anode current flows. Consequently, the current through the signal head 56 is exclusively determined by the current through tube 145. If, on the other hand, positive pulses are delivered through capacitor 142 to the grid 143 of triode 144, the grid bias of tube 144 is adjusted between the cutoff voltage and zero, so that an anode current flows through resistor 151. This anode current causes a voltage drop across resistor 151, which has an influence through resistor 152 on the potential of the control grid 146 of the triode 145. As the voltage at point 153 is stabilized by capacitor 154, then voltage variations at point 153 are delayed and the voltage drop across resistor 151 varies the grid potential of the control grid 146 according to the ratio of the potential divider formed by two resistors 152 and 155. The resistors 151, 152, and 155 are arranged so that for each output pulse of the tube 144, a negative voltage drop developed across resistor 151 is transferred through the two resistors 152 and 155 to the grid 146 of the tube 145, so that this tube is blocked. Similarly, when tube 144 is fully conductive, the current in signal head 56 is only determined by the anode current of tube 144. As this current is in the opposite direction compared with the current from tube 145, the magnetic field induced by head 56 is altered in its polarity, that is, the pulses are recorded on the passing magnetic layer corresponding to the pulses entering through capacitor 142.

If the transfer direction of the amplifier 63 is to be reversed, the two switches 107 and 109 are switched over into their switching positions *b*, so that now signal head 61 is connected in circuit to the cathode 149 of tube 145 instead of signal head 56, whereas signal head 56 is connected in circuit in switching position *b* of switch 109 to the capacitor 156 and the grid 136 of double triode 135.

FIG. 8 shows one of the flip-flops 65 or 70. These flip-flops are used for the control of the amplifiers 63 and 65 or 66 and 67. FIG. 8 is described with reference to flip-flop 65. The circuit diagram and the usual operation of such flip-flops may be presumed as known. The control of the amplifiers 63 and 65 is effected in such a way that through input lead $65^1$ and the two capacitors 156 and 157, positive pulses are delivered to the two grids of the double triode 158. Assuming that the right-hand system of the double triode 158 had been conductive, the flip-flop will be switched by the positive pulse so that the left-hand system is conductive. The voltage at the two output leads $65^2$ and $65^3$ will be altered in such a manner that the voltage at lead $65^2$ becomes less negative than the relatively great value of the voltage drop across the anode resistor 159. On the other hand, lead $65^2$ then has a negative voltage value, since an anode current flows through anode resistor 160, and accordingly a voltage drop is developed across said resistor and lowers the voltage at point 161. Point 162 is now only negative with respect to ground by the value of the voltage drop across resistor 163.

The voltage drop across resistor 163 which now exists at lead $65^3$, has a value such that the grid bias of grid 140 of the tube 141 (FIG. 7) is prebiased in the amplifier 64 to such a degree that the cutoff voltage of this tube is not yet reached. The additional voltage drop across the two resistors 159 and 160 at the alternative switching positions of the flip-flop decreases the voltage on the leads $65^3$ and $65^2$, respectively so that the bias at grid 140 of the appropriate amplifier 63 or 64 has a value such that the pulses introduced into these amplifiers do not exceed the cutoff voltage of the tube 141 and are therefore blocked. The flip-flops 85 and 123, also shown in FIG. 6, differ from the flip-flop shown in FIG. 8 only in that there is no control lead $65^3$ and the pulses enter the two grids of the double triode 158 by two separate input leads through the two capacitors 156 and 157.

FIG. 9, shows one of the controllable amplifiers 72, 73, 74, 75, 76, 84, 116, and 124 of FIG. 6. FIG. 9 will be described in connection with amplifier 84. In this amplifier, pulses enter through input lead $84^1$ and capacitor 164 to the left-hand grid 165 of the double triode 166. The grid 165 is negatively prebiased through grid resistor 169, by the potential divider which is composed of the resistors 167, 168 and 83. This negative bias is chosen such that pulses arriving at input lead $84^1$ are blocked by the left-hand system of the double triode 166. If the contact 81 is switched from its switching position *a* to the switching position *b*, the charged capacitor 82 is discharged through resistor 83 to ground, and a positive voltage is developed across resistor 83. This increases the bias at the grid 165, so that the pulses entering at input lead $84^1$ are amplified. The increasing of the bias at grid 165 lasts until capacitor 82 has been discharged to a predetermined voltage level. The time constant of the capacitor 82 and the resistor 83 are chosen such that the amplifier 84 remains conductive for a period of approximately two revolutions of the intermediate storage drum 47.

After the pulses have been amplified in the left-hand system of the double triode 166 they are passed through capacitor 170 to the grid 171 of the right-hand system of the double triode. The pulses are also amplified within this system and are passed through capacitor 172 to the output lead $84^2$. The amplifiers 72, 73, 74, 75, 76, 116, and 174 are of the same circuitry and structure as that shown, but they are not controlled by the resistor-capacitor combination formed by capacitor 82 and resistor 83, but by the corresponding flip-flops.

Figure 10:
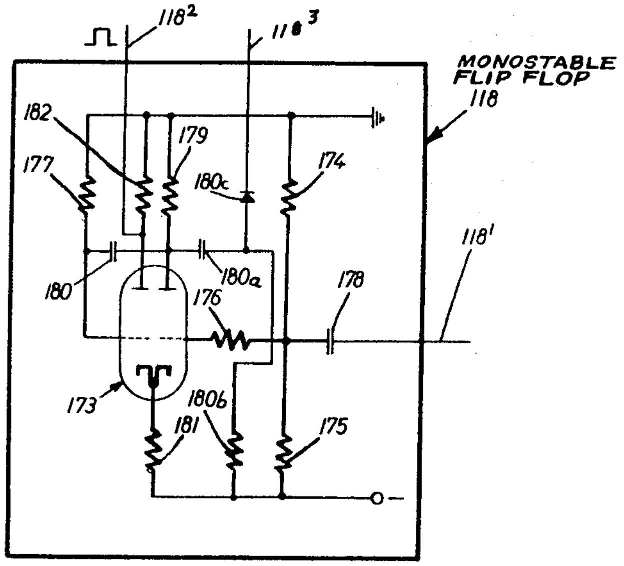

FIG. 10 shows one of the monostable flip-flops 118, 122 and 127 which are used in FIG. 6. FIG. 10 refers in particular to the monostable flip-flop 118. The flip-flop 118 includes the double triode 173, the right-hand grid of which is biased through grid resistor 176 by the potential divider composed of the resistors 174 and 175, so that no anode current will flow in the right-hand system of this double triode in its normal condition. On the other hand, the left-hand system of double triode 173 is biased through resistor 177 so that normally an anode current will flow through this system.

If the positive pulses arriving through input leads $118^1$ and capacitor 178 are applied to the right-hand system of the double triode 173, the grid potential in this right-hand system increases so that an anode current flows through the system. Hence a negative voltage drop is developed across anode resistor 179 and through capacitor 180 is applied to the grid of the left-hand system, so that the anode current in the left-hand system of the double triode 173 decreases.

After the passage of the pulse which had been applied to input lead $118^1$, the left-hand system of the double triode 173 remains blocked for a period, until capacitor 180 has been charged through resistor 177 and until the grid bias potential reaches a sufficient value for the anode current to flow again. Simultaneously, the right-hand system of the double triode 173 will be blocked, that is, the anode current of the right-hand system equals zero.

Upon cessation of the anode current, the voltage drop across anode resistor 179 equals zero. The positive pulse appearing at the right-hand anode of the double triode 173 will be differentiated by capacitor **180*a* and resistor 180*b* and will be conducted through diode 180*c* to the output lead $118^3$. During the momentary interruption of the anode current through the left-hand system of the double triode 173, the voltage drop across anode resistor 182 in the normal condition of the double triode is reduced to zero. Consequently, the potential of lead $118^2$ will be increased momentarily. By this increase of the voltage, the associated amplifiers, in the case shown the amplifier 117, are momentarily made conductive, and this conductive period is determined by the time constant of resistor 177 and capacitor 180**.

Figure 11:
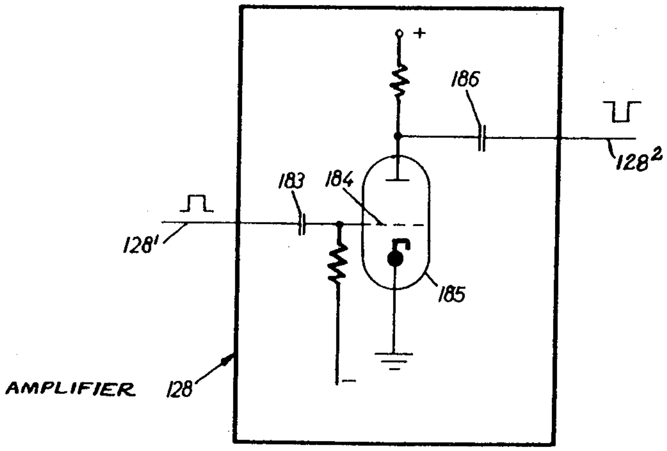

FIG. 11 shows the amplifier 128 in more detail. Positive pulses enter the amplifier through input lead $128^1$ and are applied through capacitor 183 to grid 184 of triode 185. The pulses are amplified in the triode 185 and are inverted. They are passed through capacitor 186 to the lead $128^2$.

Figure 12:
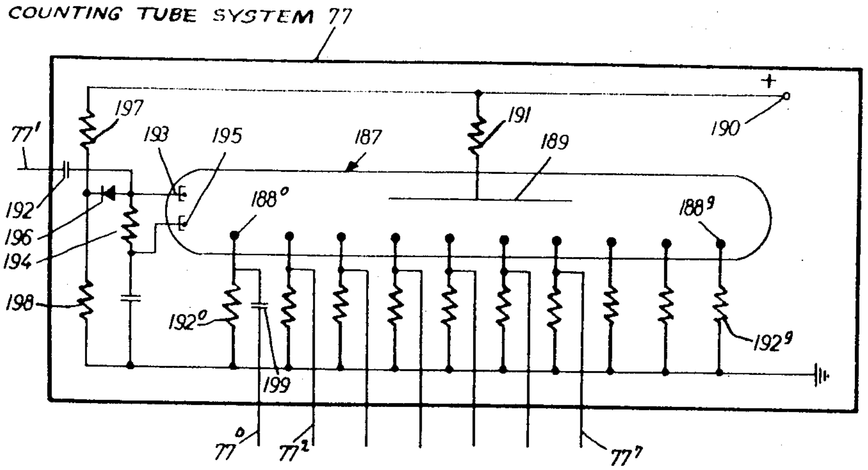

FIG. 12 shows the counting tube system 77 in greater detail. It includes the counting tube 187 with the counting cathodes $188^{0-9}$. An anode 189 is connected to plus pole 190 by anode resistor 191. This positive voltage is such that a glow discharge is set up between the anode 189 and one of the counting cathodes $188^{0-9}$ which, through cathode resistors $192^{0-9}$, are connected with ground. This glow discharge is advanced from counting cathode to counting cathode, by negative pulses entering the auxiliary electrode system 193 from input lead $77^1$ through capacitor 192. These negative pulses, after a little delay, are also applied to the auxiliary electrode system 195 through resistor 194. The two auxiliary electrode systems 193 and 195 each include single electrodes interposed between the single counting cathodes $188^{0-9}$. They are positively biased through diode 196 by the voltage divider consisting of resistors 197 and 198. Each of the negative pulses arriving through capacitor 192 causes an advance of the glow discharge from one of the counting cathodes $188^{0-9}$ to the next.

A positive potential is developed across the associated cathode resistor by the discharge current which flows from one of the counting cathodes $188^{0-9}$ through said associated cathode resistor. The potentials so developed at the cathode resistors $192^{1-6}$ are used for the control of the control stages described in more detail in FIG. 13. These potentials are applied to the control stages through the output leads $77^{2-7}$. A negative pulse may be applied to the counting cathode $188^0$ at lead $77^0$ through capacitor 199, so that the counting tube 187 may be adjusted to its zero position, that is, the glow discharge is advanced from the counting cathode at which it is reacting to the counting cathode $188^0$. The counting tube system 87 is of the same circuitry and structure as the counting tube system 77 shown. It differs only in that a 12-stage counting tube is used in the counting tube system 87 instead of the 10-stage tube shown in system 77 and that the potentials across the cathode resistors of the cathodes 1–10 are used for the control of the corresponding control stages $123^{1-10}$.

In FIG. 13, one of the control stages $119^{1-5}$ or $121^{1-10}$ is shown in more detail. To control stage of FIG. 13 includes a triode 200, the cathode of which is connected to ground. The grid is negatively biased through the potential divider consisting of the resistors 201 and 202, so that no anode current flows in the normal condition of this double triode.

Control leads $77^1$ is connected through the cathode resistor $192^1$ of the counting tube system 77 to ground. If a glow discharge exists at cathode $188^1$, a positive potential is developed across cathode resistor $192^1$, increasing the potential on the grid of the triode 200 so that anode current flows from the plus pole 204 through relay 205 and triode 200 to ground. Relay 205 is energized by this anode current and its associated contact $28^1$ (FIG. 3) will be closed.

FIG. 14 shows the two counting tubes 79 and 80, forming a counting tube system having two stages. The counting tube system has a counting capacity of 100 pulses. This is accomplished by the fact that counting tube 79 delivers an input pulse to counting tube 80 after 10 pulses are fed into tube 79. Counting tube 80, after receiving 10 pulses delivers an output pulse to lead $80^2$, that is, 100 pulses are fed in over lead $79^1$ before an output pulse occurs at the output lead $80^2$. The operation of the counting tubes 79 and 80 is the same as for the counting tube 77, that is, pulses are conducted through capacitor 205 to the auxiliary electrode systems 206 and 207 and advance the glow discharge between the anode and the individual counting cathodes by one stage. The counting cathodes $208^{1-9}$ are connected directly to ground and counting cathode $208^{10}$ is connected through cathode resistor 209 to ground.

When the glow discharge reaches counting cathode $208^{10}$ a current flow through cathode resistor 209 to develop a positive potential. This sudden positive potential generates a pulse which is conducted through capacitor 210 to the grid of the triode 211. The pulse is amplified and inverted by the triode 211 so that that after it has been conducted through capacitor 212 to the auxiliary electrode system 213 and 213a it is applied to the counting tube 80 to advance the glow discharge from one cathode to the next. Connected with the grid of triode 211 is a capacitor 214 through which pulses may be fed via lead $80^1$ from amplifier 75. After the glow discharge within counting tube 80 has reached the counting cathode $215^{10}$, a positive potential is developed across cathode resistor 216 and passed through capacitor 217 to output lead $80^2$. This pulse is used for further control purposes in connection with the process described with references to FIG. 6.

Figures 15, 16:
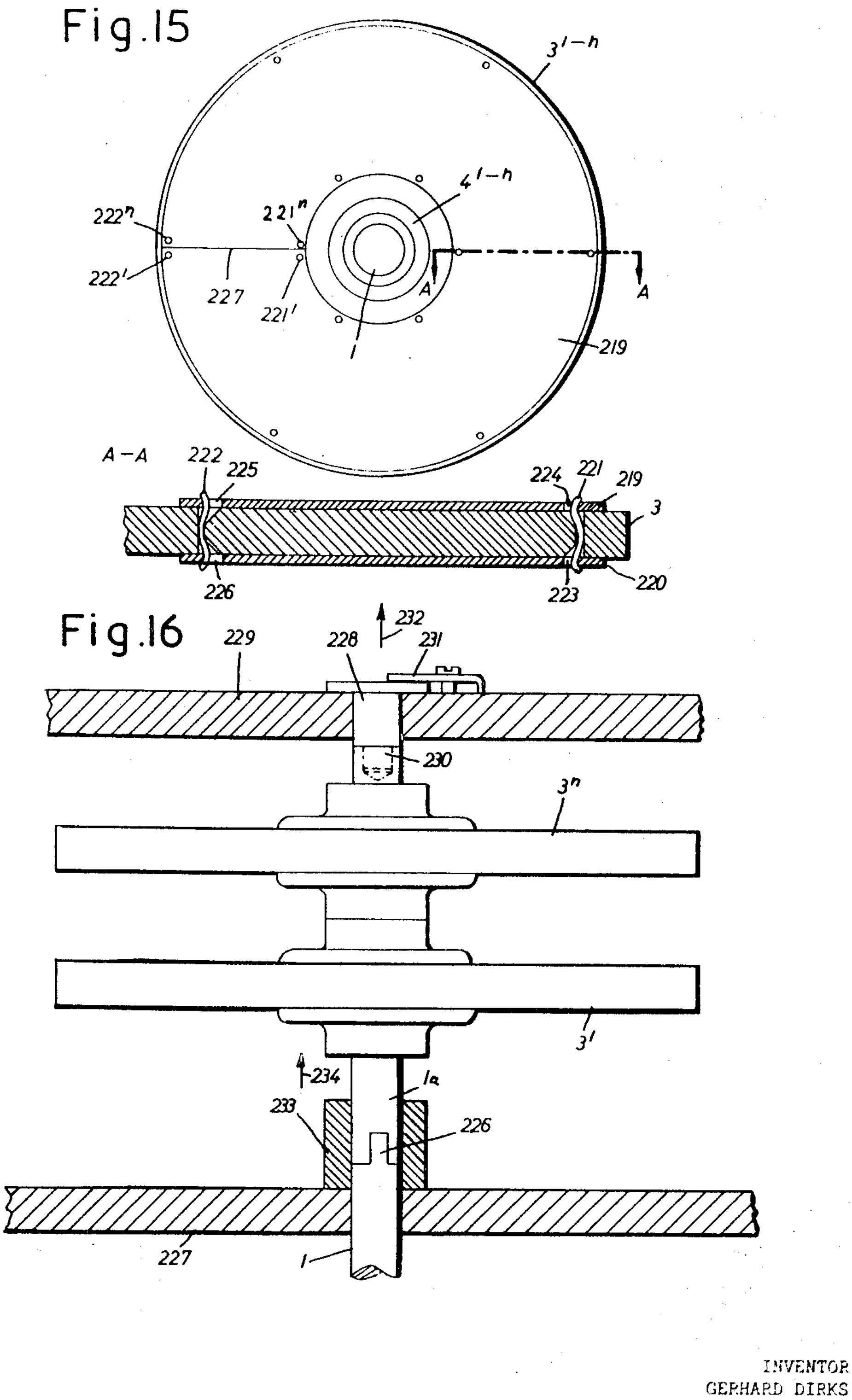
FIGS. 15 and 16 illustrate arrangements for the interchange of storage surfaces.

FIG. 15 and 16 show different methods of enlarging the storage capacity of the storage discs by replacing the storage surfaces of the different storage discs as shown in FIG. 15, or by interchanging the single storage discs as shown in FIG. 16.

FIG. 15 shows one of the storage discs $3^{1-n}$ which is mounted by the bushings $4^{1-n}$ on shaft 1. At both sides of the storage discs magnetizable foils or layers 219 and 220 are clamped, as shown in more detail in the sectional view A—A of FIG. 15. The foils are clamped by springs $221^{1-n}$ and $222^{1-n}$ on the storage disc 3. These springs clip into notches 223, 224, 225, and 226. Since the diameter of the innermost track is equal to half of the diameter of the outermost track for maximum use of the storage disc, the foils 219 and 220 may be designed as broad circular rings. In order to put them easily on the storage discs 3 it may be useful to cut these circular foils along one radius, as has been shown in FIG. 15, along the line 227. In order to rigidly clamp the foils on storage disc 3, on each side of this cut two springs 221 and 222 are arranged. The foils may be made of thicker material and may also be cut into several sectors, so that at each of these cut lines an arrangement of the springs 221 and 222 corresponding to the springs $221^{1-n}$ and $222^{1-n}$, respectively, is provided.

The arrangement of FIG. 16 includes the shaft 1 which is connected to shaft 1*a* by a claw coupling or a similar device 226. The shaft 1 is rotatably mounted in the side frame part 227. The second bearing for shaft 1*a* is formed by the bolt 228, which is held in plate 229. The bolt 228 carries at one end a pin which engages and extends into the bore 230 of shaft 1*a* and constitutes a bearing for this shaft 1*a*. The bolt 228 is clamped by the bracket 231 to the side frame 229.

After the bracket 231 is removed, bolt 228 may be moved in the arrow direction 232 so that the upper end of shaft 1*a* is released. In order to prevent a movement when the device is in operation, a movable sleeve 233 is provided over the connection between the shafts 1 and 1*a*. If shaft 1*a*, on which the storage discs $3^{1-n}$ are mounted, is to be removed from its mounting, then, as described above, bolt 228 is lifted in arrow direction 232 and sleeve 233 is likewise moved upwards in arrow direction 234, so that the coupling is free, and the shaft 1*a* may be removed together with the storage discs $3^{1-n}$ and may be replaced by another similar set of storage discs.

FIGS. 17 to 20 show different forms of the drive, or different arrangements of the storage discs $3^{1-n}$.

Figure 17:
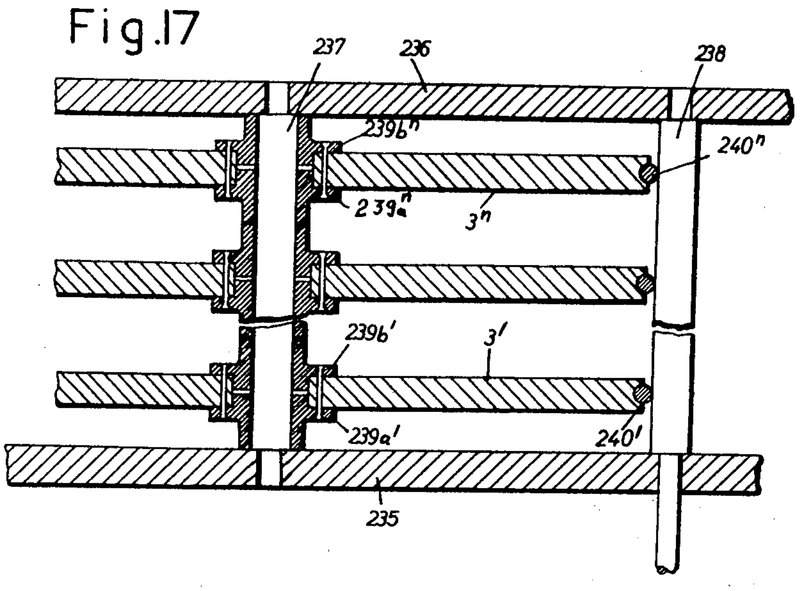
FIG. 17 shows another structure for the drive of the storage discs.

FIG. 17 shows an arrangement to drive the storage discs, not from the shaft on which they are mounted, but from the periphery of these discs. The arrangement includes the two side frames 235 and 236, in which the two shafts 237 and 238 are rotatably mounted. Shaft 237 is used as a bearing shaft for the signal storage discs $3^{1-n}$, whereas shaft 238 is used as driving shaft. The storage discs $3^{1-n}$ are mounted rotatably by the holding bushings $239a^{1-n}$ and $239b^{1-n}$ on shaft 237. The periphery of the storage discs $3^{1-n}$ has means 240 to increase the friction between the storage discs and the shaft 238 and to compensate for irregularities in the concentricity of both parts. Rotational movement of shaft 238 is therefore transferred by friction to the storage discs $3^{1-n}$.

Figure 18:
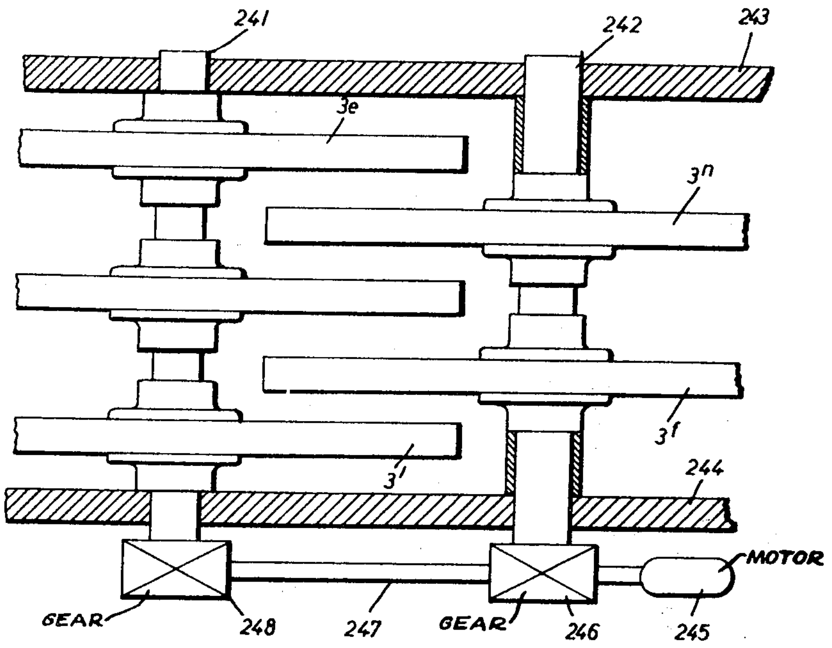
FIG. 18 shows the interposition of a plurality of storage discs mounted on parallel axes.

FIG. 18 shows one arrangement of a plurality of storage discs $3^{1-n}$ in a compact form. The two driving and mounting shafts 241 and 242, which carry the storage discs $3^{1-e}$ and $3^{f-n}$ are rotatably mounted in the two side frames 243 and 244. They are driven by motor 245 through gear 246 and shaft 247, as well as through gear 248. The storage discs $3^{1-n}$ are secured to their respective shafts 241 and 242.

Further, they are mounted on the two shafts 241 and 242 so that each storage disc of the set of storage discs $3^{f-n}$ mounted on shaft 242 extends between the two adjacent storage discs $3^{1-e}$ which are mounted on shaft 241, as shown in FIG. 18.

Figure 19:
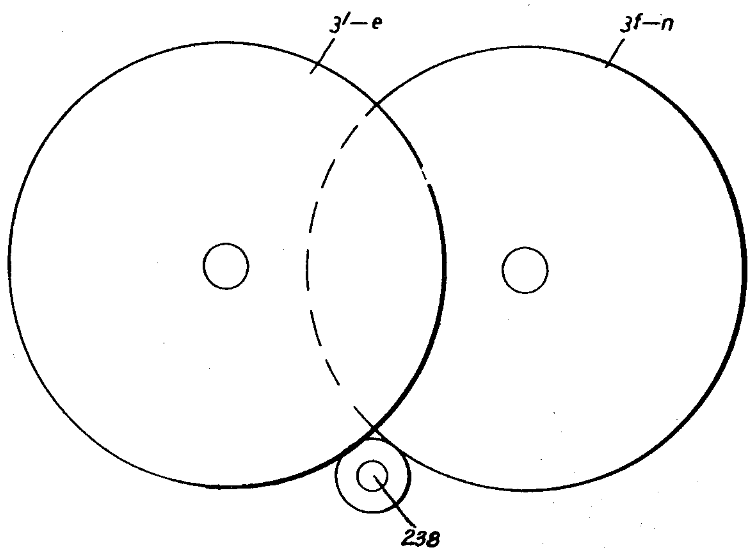
FIGS. 19 and 20 show driving and control means for such storage discs.

FIG. 19 shows a cross section of the arrangement of storage discs $3^{1-e}$ and $3^{f-n}$ shown in FIG. 18, but in this arrangement the driving principle has been used which is illustrated in FIG. 17. The driving roll 238 is here pivoted so that the circumferences of the two sets of storage discs $3^{1-e}$ and $3^{f-n}$ are in frictional engagement with the driving roll and both groups of storage discs are driven simultaneously by said driving roll.

Figure 20:
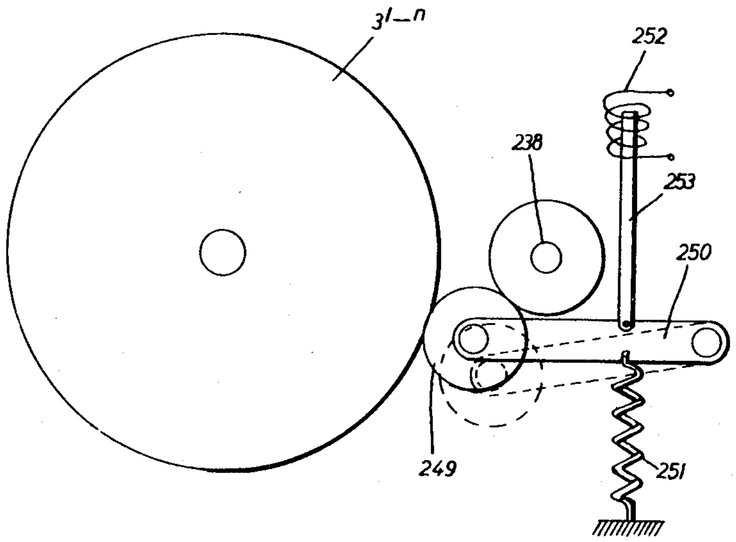

In FIG. 20 there is shown a driving arrangement using the driving principle illustrated in FIG. 17. Between each of the storage discs $3^{1-n}$ and the driving shaft 238 a movable intermediate gear wheel is interposed which is rotatably mounted on the movable arm 250 so that the rotation of shaft 238 may be conveyed frictionally to the intermediate gear wheel 249 and from there to the storage discs $3^{1-n}$. The intermediate gear wheel 249 and the arm 250 are adjustable between one position shown in full lines and another position shown in broken lines. Normally the movable arm 250 is held by a tension spring 251 in the position indicated by the broken lines. If a magnet winding 252 is energized, armature 253, which is connected with the movable arm 250, is attracted so that the intermediate gear wheel takes up the position indicated by the full lines, and the rotary movement of shaft 238 is conveyed to the storage discs $3^{1-n}$.

Figures 21, 21A:
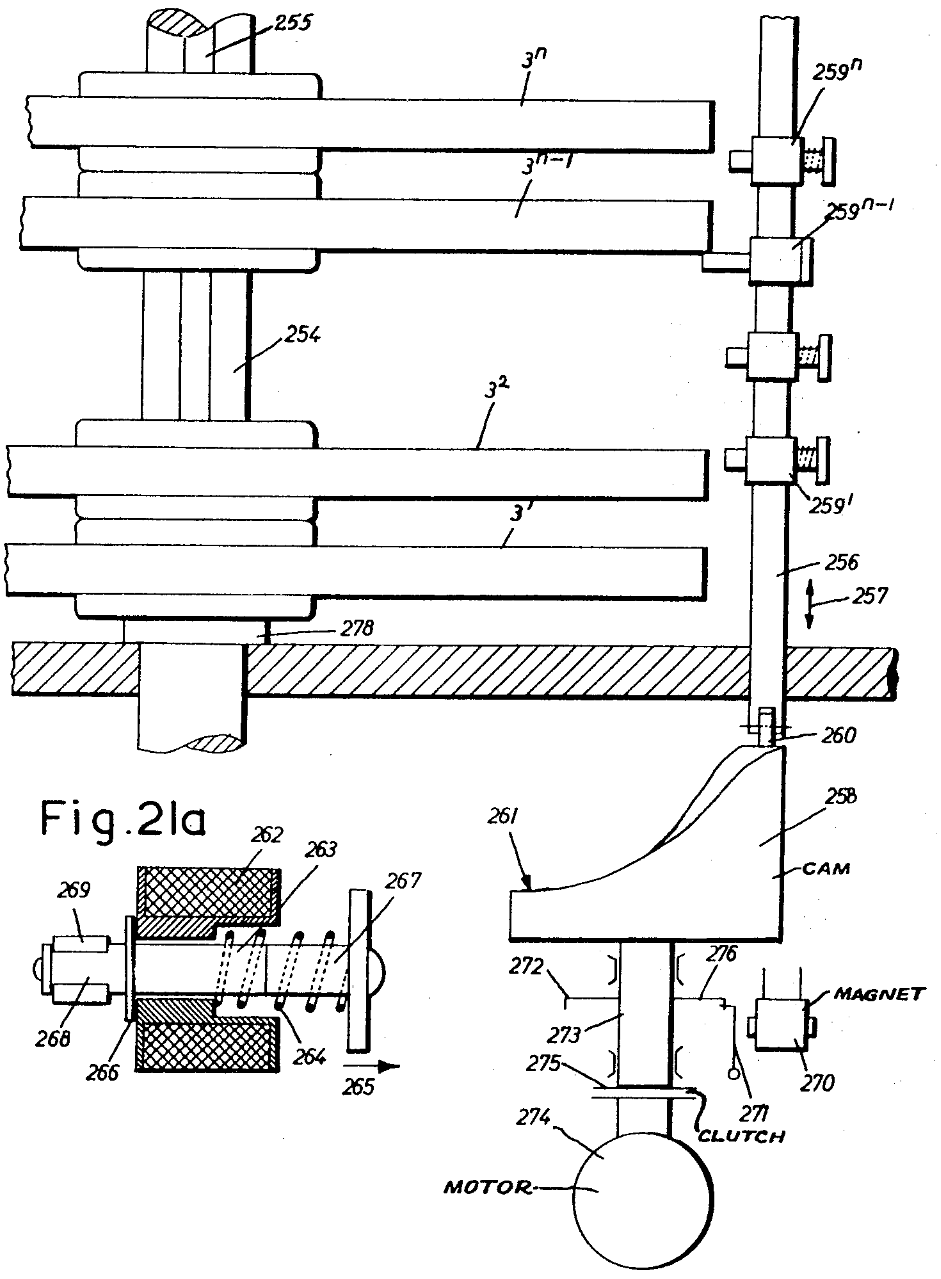
FIG. 21 and 21*a* show signal storages with axially shiftable signal storage discs and selection means with selective devices operating from the circumference.
Figure 22:
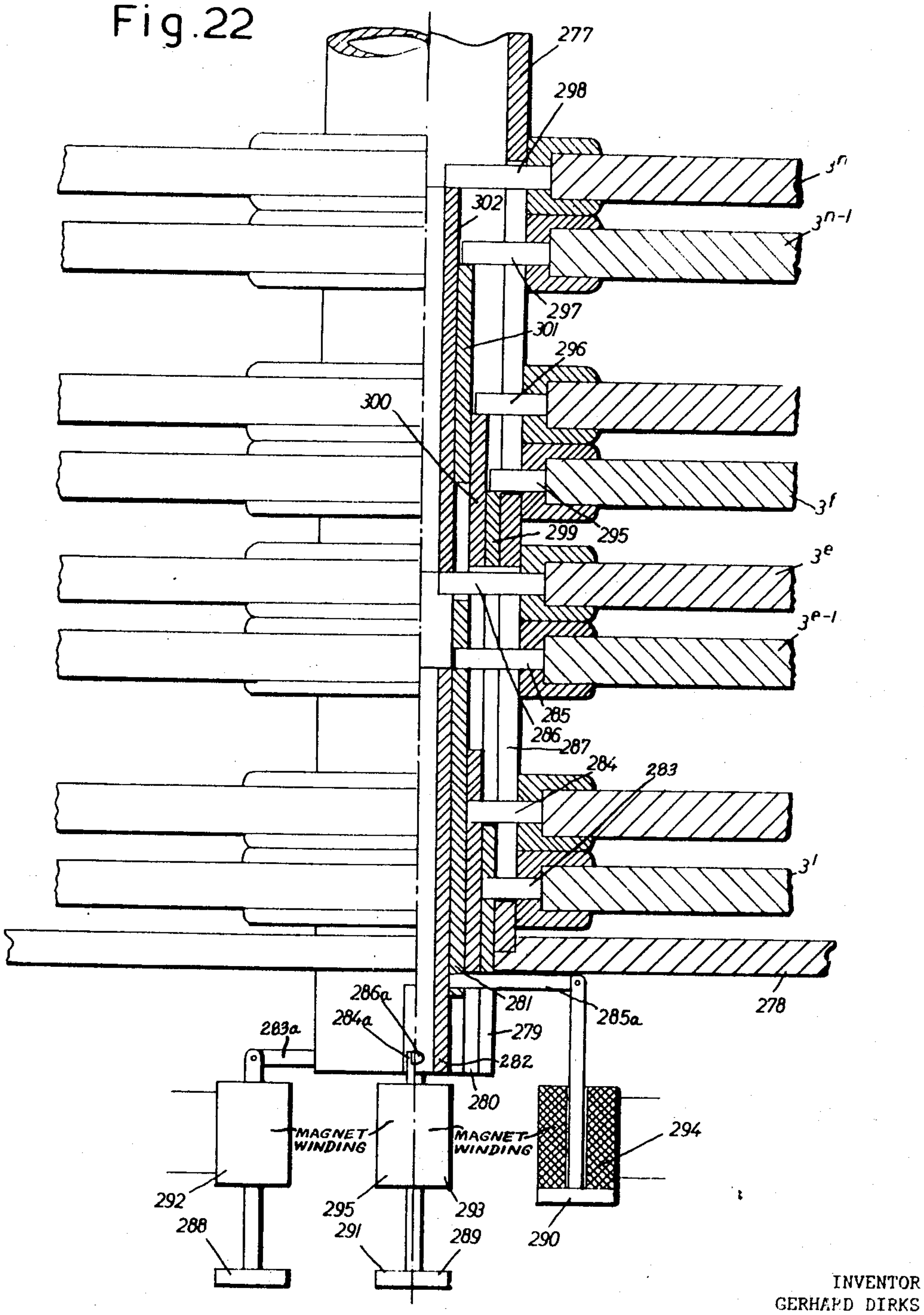
FIG. 22 shows an alternative arrangement with selective control devices operating from the interior part of the discs.

FIGS. 21 and 22 show various devices by which the individual storage discs may be arranged compactly relatively to each other and in which means are provided to establish between selected discs a space allowing the recording or sensing of information on the respective storage surfaces.

FIG. 21 shows an arrangement in which the shifting of the single discs in axial direction is performed by means operative at the circumference edge of the separate storage discs $3^{1-n}$. The storage discs $3^{1-n}$ are mounted on shaft 254 in such a way that they are movable in axial direction while they are protected against distortion by keyways engaging the key 255. In a normal condition, all the discs of a group, for instance 10 discs, lie compactly upon each other, as for instance, the discs $3^{1}$ and $3^{2}$ and two storage discs $3^{(n-1) \text{ and } 3n}$. Shifting of the storage discs $3^{1-n}$ is effected by moving the rod 256 in arrow direction 257. This movement is accomplished by the cam disc 258. The rod 256 is provided with the magnets $259^{1-n}$ which are arranged at regular equal distances from each other on the rod 256, corresponding to the distance between the single storage discs $3^{1-n}$, when these are in compact position upon each other.

In normal condition, the cam disc 258 is rotated by 180° so that the roll or roller 260 pivoted at the lower end of the rod 256 is supported at point 261 of the cam disc 258. One of the magnets $259^{1-n}$ is shown in more detail in FIG. 21*a*. *The pin 263 is movably supported in the magnet coil 262. The pin 263 is moved by spring 264 in arrow direction 265 to a position at which the projection 266 lies against the magnet coil 262. The pin 263 includes the armature 267 which is made of a nonremanent magnetic material and the extension 268 made of a nonmagnetic material. The extension 268 carries at its front end a roll or roller 269 which acts against one of the storage discs* $3^{1-n}$. The magnets $259^{1-n}$ are arranged in such a way on the rod 256, that in the deenergized condition shown in FIG. 21*a* the roller 269 does not touch the storage discs $3^{1-n}$ during the movement of rod 256 in arrow direction 257.

If, on the other hand, the magnet coil 262 is energized, armature 267 is actuated so that the movable part 263 is moved into a position shown for the magnet $259^{n-1}$. Such an energization of magnet coil 262 takes place when the cam disc 258 has been rotated by 180° and when roll or roller 260 is supported on the cam disc at point 261. After one of the magnets $259^{1-n}$ has been energized, magnet 270 is energized whereby the armature 271, which represents an arrestor for the projection 262, will be momentarily actuated, so that the shaft 273 on which cam disc 258 is mounted and which is driven by motor 274 through friction clutch 275, may rotate sufficiently for projection 276 to engage armature 271. The two projections 272 and 276 are displaced relatively to each other by 180° so that the cam disc 258 will then be in the position shown and the storage discs $3^{1-n}$ above the energized magnet $259^{1-n}$ are lifted upwards.

In the space between two adjacent storage discs obtained by the lifting of the upper pile of discs the corresponding sensing and recording means may be fed in so that a recording or sensing of signals may take place. One or more other groups of storage discs of which each first storage disc $3^{1}$ etc., is supported by a support corresponding to the support 278 may be arranged above the groups of storage discs $3^{1-n}$. Other groups of magnets $259^{1-n}$ may be provided for these other groups of storage discs. The same lifting means then serves a plurality of assemblies of discs.

Such a subdivided arrangement of storage discs into separate groups has the advantage that if, for instance, with a total capacity of 50 discs, the storage disc $3^{5}$ is to be sensed, then, in an ungrouped arrangement all the 45 discs arranged above the disc $3^{5}$ must be lifted. If, on the other hand, the 50 storage discs are subdivided into 5 groups each of ten discs then only a few discs must be lifted. For instance, if the storage disc $3^{5}$ in the lowest group is to be sensed, then only the five storage discs above it within this one group must be lifted.

FIG. 22 shows an arrangement in which the shifting of the storage discs $3^{1-n}$ is effected by elements at the hubs of the discs. This arrangement includes the hollow shaft 277 which is mounted rotatably in the bearing 278. The storage discs $3^{1-n}$ are arranged to be movable in an axial direction on the hollow shaft 277. In the structure shown, the storage discs are subdivided into two groups $3^{1-e}$ and $3^{1-n}$. Other groups may be arranged above these groups. Movement of the single discs $3^{1-n}$ is effected by tubes, 279, 280, 281, and 282 which are arranged within the hollow shaft 277 in a concentric arrangement one around the other.

The single storage discs $3^{1-n}$ are provided at their hubs with studs 283, 284, 285, and 286 of different lengths. The lengths of these studs 283–286, which extend through a slot 287 of the hollow shaft 277, form steps so that the stud 283 ends at the interior diameter of tube 279 and stud 284 ends at the interior diameter of tube 280.

Stud 285 ends at the interior diameter of tube 281 and stud 286 ends at the interior diameter of tube 282. The tubes 279 to 282 are protected against a radial movement, so that during one revolution of shaft 277 the studs 283 to 286 move over the upper ends of the tubes 279–282, or alternatively, these studs may be provided with rolls or rollers so that they may roll upon the upper ends of the tubes.

If now one of the tubes 279 to 282, as shown in FIG. 22 for tube 281, is shifted in the axial direction, then the stud supported by its upper end will also be shifted (in the example shown stud 285). Thus that storage disc with which the stud is associated is lifted, together with the tube, in the axial direction and likewise those storage discs above this selected storage disc (in the case shown, the storage disc $3^e$). Consequently, there will be between two adjacent storage discs an interspace of a size in which sensing and recording elements may be moved. Shifting of the tubes 279–282 is performed by studs 283*a*, 284*a*, 285*a*, and 286*a* which are provided at the lower ends of the tubes.

Stud 283*a* is connected with tube 279, stud 284*a* with tube 280, stud 285*a* with tube 281 and stud 286*a* with tube 282. Shifting of any tube is possible since each tube through which a stud passes is provided at the appropriate point with a notch 287 in which the corresponding stud may be lifted in axial direction. Such an axial movement may be effected under the control of a selective actuation of the armatures 288, 289, 290, or 291 which are connected with the respective studs 283*a*–286*a*. The movement of the armatures 288 to 291 is effected by energization of the appropriate magnet winding 292, 293, 294, and 295 whereby the associated armatures 288 to 291 are actuated, as shown in FIG. 22 for armature 290.

A movement in the axial direction of storage discs of the group of storage discs $3^{f-n}$ lying above the first group is effected as follows. Between the single studs of the corresponding storage discs, in the example between stud 283 and stud 295, between stud 284 and stud 296, stud 285 and stud 297 and between stud 286 and stud 298, there are arranged single distance tubes 299, 300, 301, and 302. If for instance storage disc $3^{e-1}$ is lifted, as shown in FIG. 22, the stud 285 also lifts the distance tube 301 so that the storage disc $3^{(n-1)}$ provided with stud 297 is likewise lifted.

The distance tubes 299 to 302 rotate together with hollow shaft 277 and the storage discs $3^{1-n}$. They are provided with appropriate axial openings in order to avoid obstructing the passing studs in their axial movement.

Figure 23:
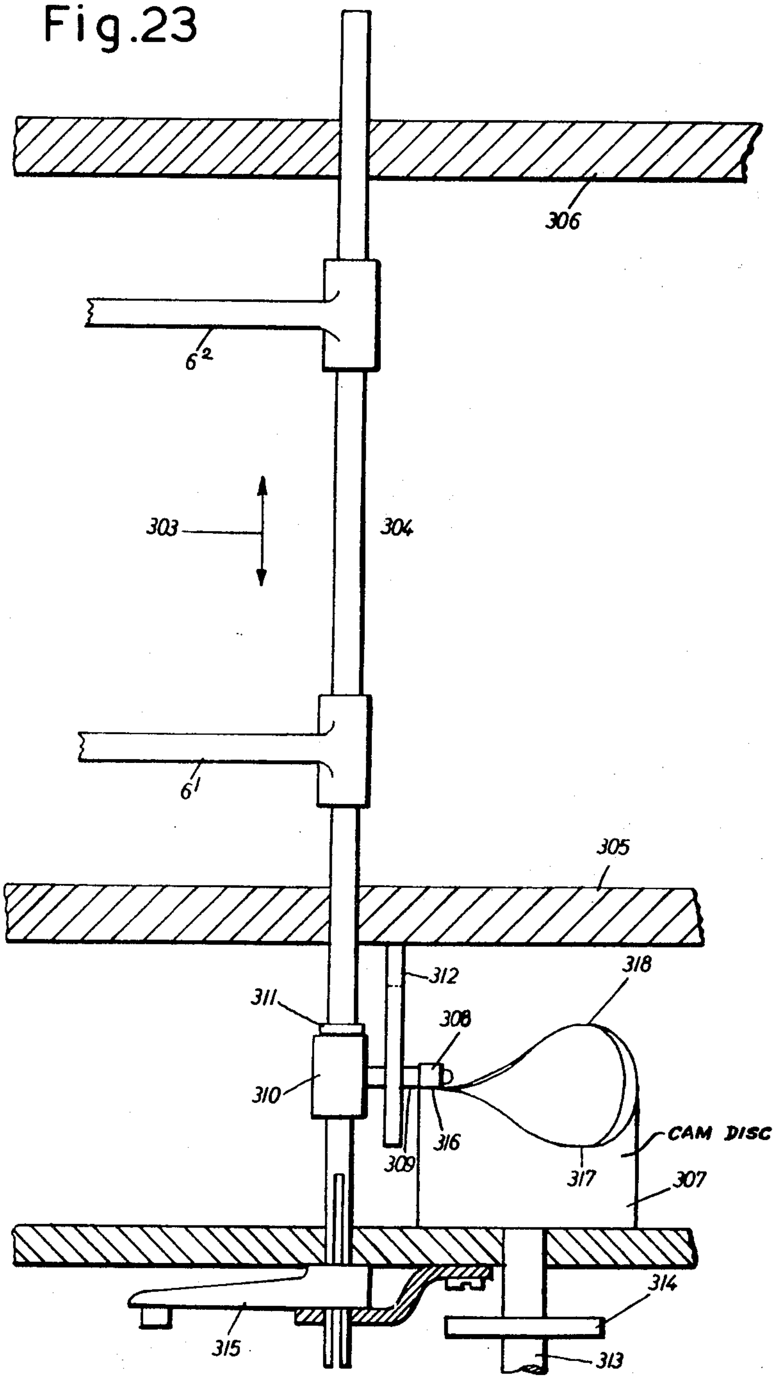
FIG. 23 shows control devices of a mechanical type for making these selections.

FIG. 23 shows a device by which the two swinging carrier arms $6^1$ and $6^2$, carrying at their free ends sensing and recording means, may be shifted in arrow direction 303, so that both movable carrier arms $6^1$ and $6^2$ may be moved into a space between two storage discs $3^{1-n}$, which may be permanently arranged or may be opened by a device corresponding to that of FIG. 21 or FIG. 22.

The two carrier arms $6^1$ and $6^2$ are secured to a spindle 304, which is rotatably and shiftably supported in the two frame members 305 and 306.

Shifting of the spindle 304 in arrow direction 303, is effected by rotating the cam disc 307. Axial movement of spindle 304 is effected by means of roller 308 rolling on the cam surface of cam disc 307, thereby shifting the shaft 309 correspondingly in arrow direction 303. Shaft 309 is coupled to bushing 310 on which shaft 304 is supported by stop 311. The shaft 309 slides within a slot of the holding device 312, so that the bushing 310 and shaft 309 are protected against accidental movement.

Rotation of cam disc 307, which is mounted on the shaft 313 is effected by a control unit such as the one which has been described with reference to FIG. 3. Shaft 313 corresponds to the shaft 23 shown in FIG. 3 and disc 314 corresponds to disc 20 in FIG. 3. The control process is similar to that in FIG. 3 by contacts sliding along the periphery of disc 314.

A swinging movement of the movable arms $6^1$ and $6^2$ is effected by the moving of the arm 315, which is similar to a crank, and corresponds to the similar arm 11 in FIG. 3. The arm 315 on spindle 204 is protected against a radial movement by keyway and key in such a way that axial movement of spindle 304 is possible within the bearing of arm 315. The swinging movement is also controlled by a device similar to the one described in detail with reference to FIG. 3.

The cam disc 307 is controlled so that the roller 308 in the normal condition lies on one of the surfaces 316, 317 or 318. The position of these surfaces is such that when roller 308 lies on one of the, the carrier arms $6^1$ and $6^2$ may be moved into the respective spaces between two adjacent storage discs $3^{1-n}$.

Figures 24, 24A:
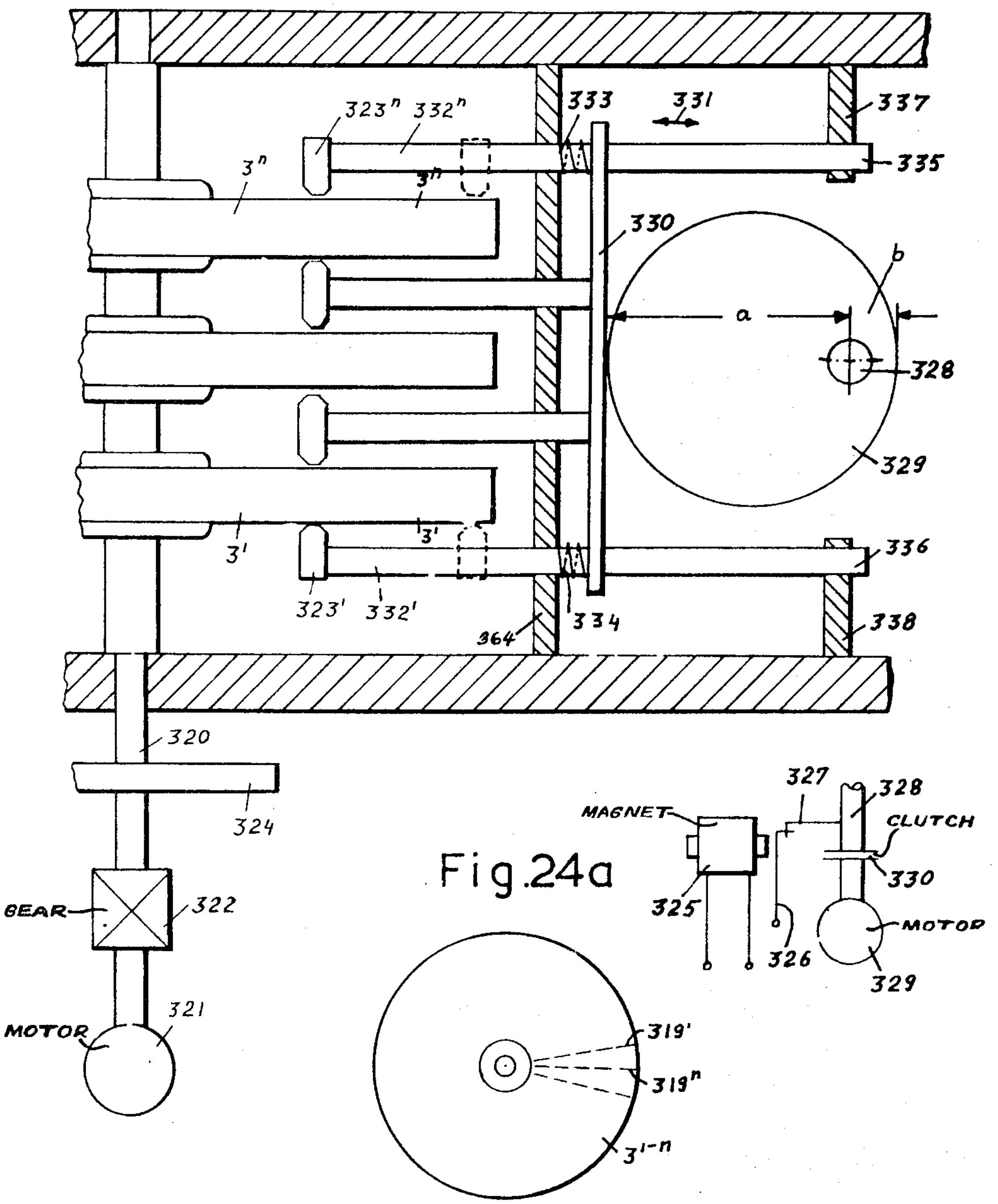
FIG. 24 and 24*a* show sensing and recording devices with radial movement of the recording and sensing arm.

FIG. 24 shows another mechanical arrangement of the storage device. In the arrangement of FIG. 24, the storage tracks on the single storage discs are not in a circular arrangement as described above, but they are arranged in a radial direction, as demonstrated in FIG. 24*a* by the broken lines $319^{1-n}$. The sensing and recording of information takes place in such a way that at first the storage discs $3^{1-n}$, which are mounted on shaft 320, are rotated by motor 321 through gear 322 to such a degree that the storage track which is to be sensed, lies opposite the sensing or recording elements $323^{1-n}$. The control of this rotary movement is effected by a device corresponding to that shown in FIG. 3; the disc 324 of FIG. 24 corresponding to the disc 20 of FIG. 3.

After the storage discs $3^{1-n}$ have been adjusted so that the track which is to be sensed is in sensing position, that is, opposite the sensing elements $323^{1-n}$, magnet 325 is energized and armature 326, which normally arrests projection 327, is momentarily attracted. Hence, projection 327 is released and shaft 328, which is driven by motor 329 through friction clutch 330, will rotate for one revolution. On shaft 328 is mounted the eccentric disc 329′, which moves the carrier rod 330′. By the one revolution of shaft 328, the carrier rod 330′ is moved in arrow direction 331. The movement of the carrier rod 330′ corresponds to the difference between the dimensions *a* and *b*. The carrier arms $332^{1-n}$ are mounted on the rod 330′, and these arms carry at their free ends the sensing elements $323^{1-n}$. The movement of the rod 330′, which is tensioned by the springs 333 and 334 against the circumference of the disc 329′, causes the sensing elements $323^{1-n}$ to move in relation to the storage discs $3^{1-n}$ in such a way that they move from the position drawn in full lines, into the position drawn in broken lines, and vice versa. The arms $332^{1-n}$ slide in the bearing 364 and the rod 330′ is guided by two rods 335 and 336 in the two bearings 337 and 338.

The sensing and recording on the storage is controlled in such a way that the sensing or recording of signals takes place only during the movement of the sensing and recording means from the position shown in full lines to the position shown in broken lines and vice versa. The circumference of the disc 329′ may be designed so that the sensing elements $323^{1-n}$ will make a constant movement relative to the storage discs $3^{1-n}$.

Figure 25:
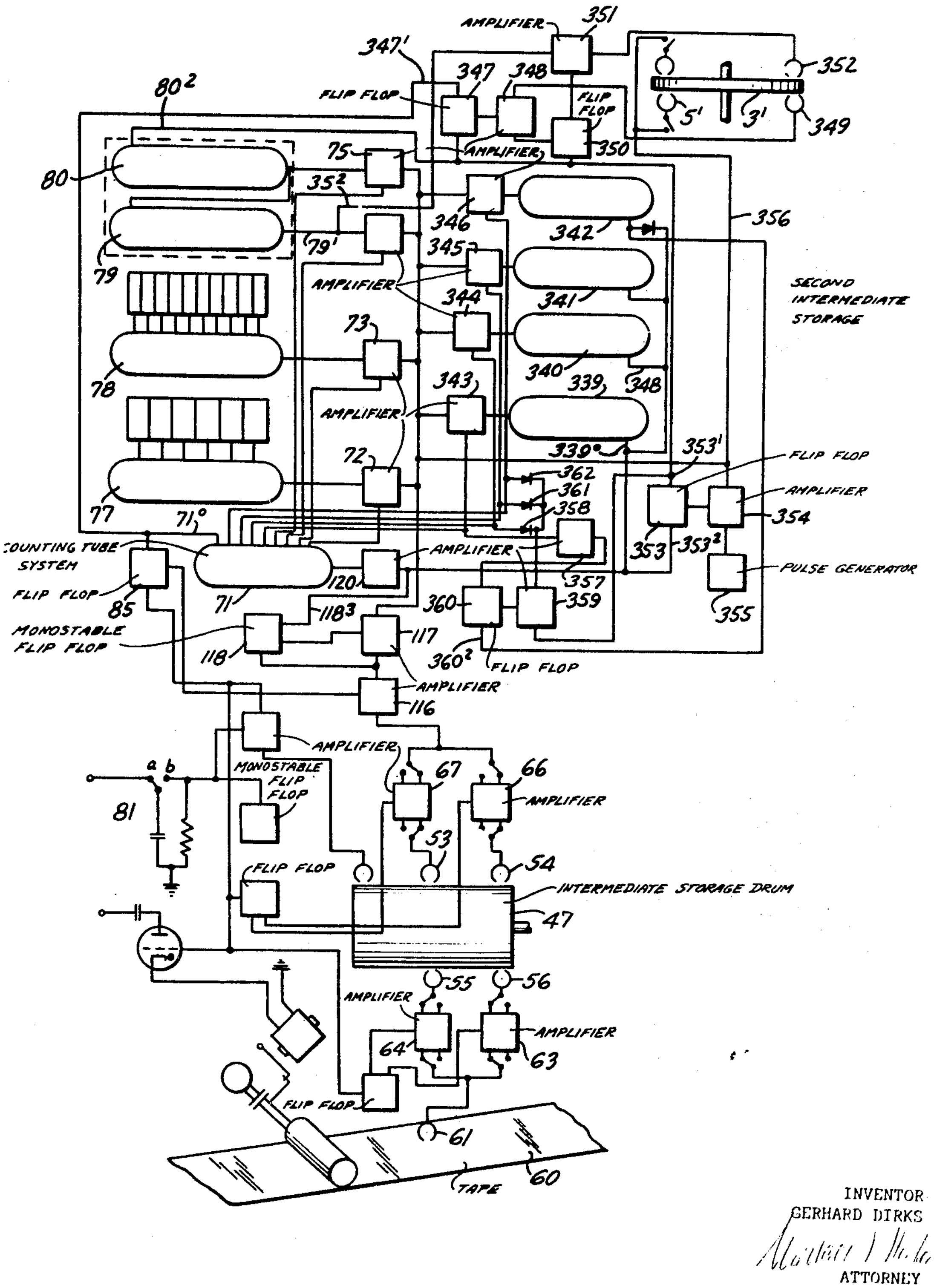
FIG. 25 shows switching circuitry of intermediate electronic storages.

The arrangement shown in FIG. 25 differs from the device of FIG. 6 primarily in that the signals from intermediate storage drum 47 are transferred to a second intermediate storage, which is constituted by the counting tubes 339, 340, 341, and 342. The transfer of the information which is to be stored is effected in the same way as shown with reference to FIG. 6, by the signals from tape 60 by sensing head 61, and their amplification by one of the amplifiers 63 or 64, and by transfer of these signals by the heads 55 or 56 to the intermediate storage drum. The signals are then sensed from the intermediate storage drum by the heads 53 or 54 and amplified in the amplifier 66 or 67 and are transferred to the input of the amplifier 116 as described above with reference to FIG. 6.

Amplifier 116 will be made conductive, as described with references to FIG. 6, by switching over contact 81 and by delivering pulses to the amplifier 117 and the monostable flip-flop 118. The switching function of the monostable flip-flop 118 and its process of operation is the same as described with reference to FIG. 6 with the only difference being that the pulses delivered through lead $118^3$ and the amplifier 120 are conducted to the counting tube system 71, and that these pulses advance this counting tube system not by steps but up to the full counting capacity of the system.

The counting tube system 71 not only controls the amplifiers 72, 73, 74, and 75, but also controls the amplifiers 343, 344, 345, and 346. The counting stages 77, 78, and 79 are adjusted in the manner described above with reference to FIG. 6, through the amplifiers 72–75, to select the storage area in which the signals will be sensed or recorded on one of the storage discs $3^{1-n}$. In FIG. 25, only storage disc $3^1$ has been shown.

After the last pulse group 104 of the address has been transferred through amplifier 75 to the counting tube 80, a further pulse is delivered, through lead $118^3$ and counting tube system 71, to make amplifier 343 conductive and allow the first pulse group 105 (FIG. **6*a*) to adjust the counting tube 339. Accordingly, counting tube 71 is advanced and the next pulse groups of the information are fed into the counting tube systems 340, 341, and 342. After the last group of pulses of the information have been delivered, counting tube system 71 is advanced to its counting stage number 1 whereby a positive pulse is passed through output lead $71^0$ to switch flip-flop 85 so that amplifier 116 is made nonconductive and repeated sensing of the signals recorded on the intermediate storage drum 47** is avoided.

Simultaneously, this pulse will be conducted through lead 347′ to the flip-flop 347, so that amplifier 348 is made conductive. When the amplifier 348 is made conductive, signal head 349 senses a synchronizing pulse from the storage disc $3^1$ to indicate the beginning of the storage tracks on the storage discs $3^{1-n}$. This pulse is amplified in amplifier 348 and is passed to flip-flop 350 and said flip-flop is switched so that amplifier 351 is made conductive.

The storage disc $3^1$ has recorded thereon other synchronization signals each of which indicates the beginning of a storage area. These pulses are sensed by signal head 352 and are amplified in amplifier 351. They are delivered through lead $35^2$ to lead $79^1$ of the counting tube 79, and advance this tube as well as counting stage 80, in the manner described with reference to FIG. 6, to their full counting capacity. After the full counting capacity has been reached a positive pulse is delivered through lead $80^2$, through lead 353′ to flip-flop 353. The flip-flop 353 is switched and amplifier 354 is made conductive, so that pulses may be amplified from pulse generator 355 by amplifier 354. These pulses are conducted through lead 356 to the recording elements $5^{1-10}$ and are recorded on the selected storage track in the selected storage area. The number of these pulses is determined by the fact that the first counting tube 339 is advanced to the full counting capacity and then the output pulse delivered through lead $339^0$ is conducted through lead $353^2$ to the flip-flop 353, so that this flip-flop is then restored into its initial state, thus making amplifier 354 nonconductive, so that no further pulses may enter lead 356 from pulse generator 355.

The entering of pulses into counting tube 339 is controlled by the pulse delivered through lead $80^2$ which pulse is conducted through amplifier 357 to that lead of counting tube stage 71 which controls amplifier 343. Hence the glow discharge will be adjusted within the counting tube 71 to this counting stage, so that the amplifier 343 will be made conductive. After the counting tube 339 is advanced to its full counting capacity, the positive pulse delivered to the output lead $339^0$ is also conducted through amplifier 120 to counting tube 71 so that this counting tube is advanced by one counting stage, amplifier 343 is made nonconductive and amplifier 344 is made conductive. This allows the pulses from the pulse generator 355 to advance the counting tube 340 to the full counting capacity. The positive pulse from the control lead of counting tube system 71 makes the amplifier 344 conductive and is conducted through diode 358 and amplifier 359 to the lead $353^1$ of the flip-flop 353 and this flip-flop makes amplifier 354 conductive. The termination of the delivery of pulses by amplifier 354 is determined again by a pulse in lead $340^0$ of the counting tube stage 340, which makes amplifier 354 nonconductive as described above for counting tube stage 339 and advances counting tube 71 by one counting stage.

Amplifier 359 is controlled by flip-flop 360, which is switched by the pulse from lead $80^2$ into such a state that pulses which are passed through the diodes 358, 361, and 362 to the input lead of the amplifier 359 may pass through this amplifier and switch flip-flop 353. Pulses conducted through the diodes 361 and 362 are generated at the making conductive of the amplifiers 345 and 346 and through said amplifiers 345 and 346 the counting tubes 341 and 342 may be advanced to their full counting capacity. The positive pulse occurring at lead 342 is conducted through lead $360^2$ to flip-flop 360 so that this flip-flop is returned to its initial state and amplifier 359 is made nonconductive. After counting tube 342 has been advanced to its full counting capacity, the information which was stored will be recorded by the selected one of signal heads $5^{1-n}$ on the appropriate one of storage discs $3^{1-n}$.

The recording is effected in this process by recording complementary values to the values of the digits stored; for example, values complementary to digit value 10 in the case of decimal counting tubes 339 to 342.

This conversion into complementary values does not alter the information, since upon the transfer of the information from one of the storage discs $3^{1-n}$ to the magnetic tape 60, the complementary value of the recorded signals on one of the storage discs $3^{1-n}$ is again derived from the complementary value to the full counting capacity of the counting tubes 339–342.

It is further possible to allow a quicker access time by providing at least a double set of recording and sensing elements $5^{1-n}$. That is, two recording and sensing elements may be positioned, for example, on one of the storage surfaces of the storage discs $3^{1-n}$, selection movements of one being effected while the other records or senses the information which corresponds to an address previously used to actuate the respective selection devices and their adjusting movements.

Another advantage, allowing fewer heads in the machine, and provided that the slower access time is not a disadvantage, is that one sensing and recording means may operate for selected ones or for a plurality of storage elements and few recording and sensing elements may be provided for a plurality of discs by shifting them relatively to the discs.

The previously mentioned magnetic storage surfaces of the storage discs $3^{1-n}$ may be replaced by optical or electrostatic storage means with appropriate sensing and recording means. With optical storage means, the signal heads $5^{1-n}$ may be replaced by photocells, photoresistors, or photodiodes comprising photosensitive transistors whereas with electrostatic storage means, these recording or sensing elements may be replaced by contact brushes or capacitive sensing and recording means. Any known elements of these various kinds may be adopted.

For the separation of storage discs normally closely spaced, the discs may be shaped at the edge to provide an entry for the separating means, and/or the discs may have notches, gaps, projections or the like of respective circumferential positions and a separating means will be provided for each such position and made effective selectively during a relative axial movement, according to which discs are to be separated. That is if, for example, the disc with its projections at 20° from a zero point is to be sensed, the separating means which is placed at 20° from the same zero point will be operative to effect the separation. Alternatively, a single separating means may be provided which is movable angularly relatively to the discs so as to select any particular gap, projection or the like by which separation is to be effected, thus permitting the operation of a single separating means at any of the discs.

The discs may be supported wholly on their supporting shafts or may be supported at or near their outer edge, or both. When supported at or near the outer edge, the supporting means may include supporting rollers in contact with the discs, especially when the discs have a rotary selection movement with respect to fixed sensing etc. means. These supporting rollers will be carried on studs projecting from a suitable support, for example, vertical posts or pillars, and one or more of such studs may also carry a driving wheel or sprocket by which the rotary selection movement may be imparted to the discs. In addition, there may be a complementary roller above the disc, driven or not driven, and this may be resiliently mounted so as to be pressed against the disc.

The record surfaces may be of the kind adapted to receive signals arasable by a change of the magnetic state of the record material, and in this connection the discs themselves may be of a magnetic material the surface of which comprises the record surface, e.g., a steel disc or nickel disc, or the discs may be made of a nonmagnetizable material with the magnetizable material for the record surface being applied thereon. Thus, for example, a brass disc may have a nickel coat, or a plastic disc may be sprayed with a ferrite or ferroelectric material, or such a material may be mixed within the nonmagnetic material so that the ultimate complex or mixture has a magnetizable surface.

Alternatively, the record surface of a disc may be adapted to receive signals by a change of the electric state of the record material, e.g., capacitive storage may be used, as, for instance, barium-titanate and, in this connection, the capacitive storage possibilities of a surface may be applied to the discs.

The record surfaces may be plain nongrooved surfaces or they may be grooved surfaces and the grooves may, if desired, be adapted to guide the sensing, etc. means. Each groove may be a single concentric groove or may be a helical groove of any desired number of turns, and the recorded signals may be recorded either in the grooves or between the grooves, or both. Furthermore, the record surfaces may comprise storages of a multi, bistable nature, e.g., in a plurality of transistors formed by a plurality of contact points on a surface composed of one or more crystals.

There may be a common sensing means for a plurality of discs, movable from gap to gap between the discs.

The discs and/or the sensing, etc. means may have continuous movement or a stepwise movement; there may be a rotational movement through a complete revolution, or there may be first a rotational movement to a starting point for the required information and then a continuous movement, as for example in cyclic sensing.

The relative movement between the disc and the sensing, etc. means may in some cases be a radial movement and may include a movement of the disc to a selected angular position and then a movement of the sensing, etc. means and/or it may include a movement of the sensing, etc. means to a selected angular position and then a radial movement.

The selection movement may include a movement of both a disc and its sensing, etc. means in such a way that a movement of the disc effects a selection of a group of signal positions and a movement of the sensing, etc. means effects a selection of any one signal position in that group, or vice versa.

A selection may be made in any case on a basis of locality and/or on a basis of time, and such selection on a basis of time and/or locality may be common to a plurality of the discs.

The rotating discs may be associated with the rotary intermediate storage which may have a higher rate of rotation, whereby signals transferred to such storage from a disc may be sensed repeatedly as for instance in cyclic sensing.

The signals may be combination or code signals of any known combination or code, for instance on a denominational basis, or other basis. These signals may be recorded serially or parallel in parallel tracks for the respective code elements.

A series of signals in a disc may include a control signal effective to transfer such series to an intermediate storage. The intermediate storage, when provided, may receive information from the disc determined by control signals at the beginning and end of the information on the disc. The information selected from a part of a sensing track on a disc may be made to fill the whole of a sensing track or sensing line in the intermediate storage.

Such intermediate storage may be of a magnetic type and the sensing line or track may comprise a track of a magnetic drum, or one vertical or horizontal groups of cores and other erasable storage elements.

The intermediate storage may have selection means operating on a basis of time and/or locality.

The transfer of signals from a disc to the intermediate storage may be effected via a further intermediate storage operating serially. Such further intermediate storage may be a counting chain or a multistage tube or tubes. There may be two intermediate storages operating in alternate series, each receiving while the other is transmitting, to effect a constant transfer of the information from the discs. Digit values may be indicated in a storage by a predetermined pulse or pulses and alphabetic characters by those pulses and additional pulses corresponding to the zonal punching of a punched card. Both sets of such pulses may be transferred by the same counting chain or multistage tube.

There may be a series of flip-flops set for combination signals selected from a disc and operating as the further intermediate storage.

In another use of the invention, information in a track or a part of a track is checked by check signals, e.g., check symbols based on prime numbers. Information selected from the disc may be stored twice and the two records compared or computed to zero. A second sensing of a disc may be effected for checking purposes, the signals from the respective sensings being compared. In such events, an unequal comparison may be operative to effect a resensing of a disc until an equal comparison occurs or until, after a predetermined number of repeated sensings, the apparatus is blocked. Checking may be effective by a comparison between the results of a preceding computation and the processing, e.g., the subtraction of another quantity such as a balance, and indicating whether the final result is zero or not.

Each information signal may comprise one or more signal pulses or waves or the like and the arrangement may be such that a signal is sensed only if and after a predetermined number of its component pulses or waves has been sensed.

In signals comprising interruptions in a constant recording, each interruption may comprise one signal component or a plurality of signal components according to a prearranged code.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A selective signal storing device comprising, in combination, a frame; a plurality of storage discs rotatably mounted about an axis in said frame, each of said discs having a signal storing surface adapted to carry a plurality of tracks on at least one face thereof; a plurality of arms arranged in a common plane and movably mounted in said plane, each of said arms having an end adapted to move in radial direction of a corresponding disc in a plane parallel with the signal storing surface of the corresponding disc; a plurality of transducer means, each adapted for sensing, recording and erasing signals on the signal storing surface of a corresponding one of said discs, each of said transducer means being mounted on the end of a corresponding one of said arms; selector means in said frame operable to move said plurality of arms simultaneously in a radial direction of said plurality of discs in planes parallel with the signal storing surfaces of said plurality of discs to align each transducer means with a selected track on the signal storing surface of a corresponding disc; drive means in said frame for effecting a relative movement between the signal storing surface of said plurality of discs and said plurality of transducer means; and control means operatively connected with each of said transducer means for selectively causing at least a selected one of said transducer means to effect sensing, recording and erasing of signals during a selected phase of said relative movement.

2. A selective signal storing device as defined in claim 1, wherein said signal storing surface of each disc is located opposite and spaced from the signal storing surface of an adjacent disc, and wherein said selector means simultaneously moves the ends of said arms and the transducer means thereon into the space between respective opposite signal surfaces to align said transducer means with a selected track on said signal storing surfaces, and including mounting means mounting each of the transducer means on the end of the respective arm movable between an inoperative position spaced from both of the respective opposite signal storing surfaces and an operative position located adjacent to either of said signal storing surfaces; and tilting means operatively connected to each of said mounting means for tilting movement of at least one of said transducer means in a plane parallel to said axis from said inoperative to said operative position.

3. A selective signal storing device as defined in claim 1, wherein said signal storing surface of each disc is located opposite and spaced from the signal storing surface of an adjacent disc, and wherein said selector means simultaneously moves the ends of said arms and the transducer means thereon into the space between respective opposite signal surfaces to align said transducer means with a selected track on said signal storing surfaces, and including mounting means mounting each of the transducer means on the end of the respective arm movable between an inoperative position spaced from both of the respective opposite signal storing surfaces and an operative position located adjacent to either of said signal storing surfaces, and shifting means operatively connected to each of said mounting means for moving at least one of said transducer means in a direction parallel to said axis from said inoperative to said operative position.

4. A selective signal storing surface as defined in claim 3, and including resilient means operatively connected to said mounting means and biased to resiliently maintain said mounting means in a position in which said transducer means mounted thereon is in said inoperative position.

5. A selective signal storing device as defined in claim 1, wherein said signal storing surface of one disc is located opposite and spaced from the signal storing surface of an adjacent disc, wherein each of said transducer means comprises a pair of transducer heads and including mounting means mounting each of said pair of transducer heads on the end of the respective movable arm relative thereto from an inoperative position spaced from both signal storing surfaces of the respective pair of opposite signal storing surfaces and an operative position located adjacent to one of the corresponding pair of signal storing surfaces; moving means operable for moving said transducer heads between said inoperative and said operative position; and operating means for operating said moving means for moving selected ones of said transducer heads from one to the other position thereof.

6. A selective signal storing device comprising a frame; a plurality of discs mounted for rotation about an axis in said frame, each of said discs having a signal storing surface adapted to carry a plurality of tracks on at least one face thereof; a plurality of transducer means at least one for each of said surfaces, each of said transducer means being adapted for sensing, recording and erasing signals on the corresponding signal storing surface; selector means in said frame operable to selectively move at least a group of said transducer means in a plane parallel with the signal storing surfaces to align the transducer means of said group with a selected track on the corresponding signal storing surfaces; a plurality of shifting means operable to selectively move at least one selected one of said group of transducer means independently of the other substantially parallel with said axis into and out of operative relationship with the signal storing surface of the corresponding disc; drive means for effecting a relative movement about said axis between said plurality of signal storing discs and a plurality of transducer means; and control means operatively connected with each of said transducer means for selectively causing at least one selected transducer means to effect sensing, recording and erasing of signals during a selected phase of said relative movement.

* * * * *